(12) United States Patent
Awoniyi-Oteri et al.

(10) Patent No.: US 11,985,649 B2
(45) Date of Patent: May 14, 2024

(54) MODIFICATIONS TO UPLINK GRANT CONFIGURATIONS

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Jelena Damnjanovic, Del Mar, CA (US); Ozcan Ozturk, San Diego, CA (US); Iyab Issam Sakhnini, San Diego, CA (US); Jing Sun, San Diego, CA (US); Sony Akkarakaran, Poway, CA (US); Yan Zhou, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 244 days.

(21) Appl. No.: 17/225,896

(22) Filed: Apr. 8, 2021

(65) Prior Publication Data
US 2021/0321424 A1    Oct. 14, 2021

Related U.S. Application Data

(60) Provisional application No. 63/008,475, filed on Apr. 10, 2020.

(51) Int. Cl.
*H04W 72/12* (2023.01)
*H04L 1/1867* (2023.01)
*H04W 72/23* (2023.01)

(52) U.S. Cl.
CPC ........... *H04W 72/12* (2013.01); *H04L 1/1887* (2013.01); *H04W 72/23* (2023.01)

(58) Field of Classification Search
CPC ...... H04W 72/12; H04W 72/23; H04L 1/1887
See application file for complete search history.

(56) References Cited

U.S. PATENT DOCUMENTS

| | | | | |
|---|---|---|---|---|
| 8,386,875 | B2* | 2/2013 | Earnshaw | H04W 72/21 |
| | | | | 714/751 |
| 2020/0106559 | A1* | 4/2020 | Vilaipornsawai | H04B 7/0408 |

FOREIGN PATENT DOCUMENTS

| WO | WO-2012052049 A1 * | 4/2012 | ........ H04W 52/0261 |
|---|---|---|---|
| WO | WO-2015184216 A1 * | 12/2015 | ............. H04J 11/00 |

(Continued)

*Primary Examiner* — Saad A. Waqas
(74) *Attorney, Agent, or Firm* — Holland & Hart LLP

(57) ABSTRACT

Methods, systems, and devices for wireless communications are described to support transmission of a resource modification information request from a user equipment (UE) to a base station, where the resource modification request may request an increased density of uplink transmission occasions. For example, the resource modification request may request an increase from a first density of uplink transmission occasions configured for the UE. The resource modification request may include a request for a decreased periodicity of uplink transmission occasions, an increased number of groups of repetitions for uplink transmission occasions, an increased number of resource blocks for uplink transmission occasions, or an increased modulation coding scheme for uplink transmission occasions. The base station may receive the resource modification request and may transmit a message to the UE, which may indicate a modified or new uplink grant configuration for uplink transmission occasions having a higher density (e.g., a second density).

32 Claims, 19 Drawing Sheets

(56) References Cited

FOREIGN PATENT DOCUMENTS

| WO | WO-2019246285 A1 | * | 12/2019 | ........... H04L 1/0001 |
| WO | WO-2020143057 A1 | * | 7/2020 | ........... H04L 1/1812 |
| WO | WO-2020164816 A1 | * | 8/2020 | ........ H04W 72/1231 |
| WO | WO-2020168235 A1 | * | 8/2020 | ........... H04L 1/1812 |
| WO | WO-2021087904 A1 | * | 5/2021 | |

* cited by examiner

MODIFICATIONS TO UPLINK GRANT CONFIGURATIONS

CROSS REFERENCE

The present application for patent claims the benefit of U.S. Provisional Patent Application No. 63/008,475 by AWONIYI-OTERI et al., entitled "MODIFICATIONS TO UPLINK GRANT CONFIGURATIONS," filed Apr. 10, 2020, assigned to the assignee hereof, and expressly incorporated by reference herein.

FIELD OF TECHNOLOGY

The following relates generally to wireless communications and more specifically to modifications to uplink grant configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station based on a configured grant for uplink transmissions. In some cases, the UE may expect an increase in uplink traffic and may be unable to transmit the increased uplink traffic using the configured grant for the uplink transmissions, which may increase delays and decrease communication quality.

SUMMARY

The described techniques relate to improved methods, systems, devices, and apparatuses that support modifications to uplink grant configurations. Generally, the described techniques provide for transmission of a resource modification request (e.g., resource modification information) from a user equipment (UE) to a base station, where the resource modification request may request an increased density of uplink transmission occasions. For example, the resource modification request may request an increase from a first density of uplink transmission occasions configured for the UE. The resource modification request may include a request for a decreased periodicity of uplink transmission occasions, an increased number of groups of repetitions for uplink transmission occasions, an increased number of resource blocks (RBs) for uplink transmission occasions, an increased modulation coding scheme (MCS) for uplink transmission occasions, or any combination thereof.

The resource modification request may also include information to support assignment of a hybrid automatic repeat request (HARQ) process identifier (ID) to one or more HARQ processes, for example, associated with the increased density of uplink transmission occasions. The base station may receive the resource modification request and may transmit a message to the UE, which may indicate a modified or new uplink grant configuration for uplink transmission occasions having a higher density (e.g., a second density). The UE may transmit one or more uplink transmissions (e.g., having a higher density or a higher number of uplink transmissions) to the base station based on the message and the modified or new uplink grant configuration.

A method of wireless communication at a UE is described. The method may include communicating with a base station according to a first uplink grant configuration scheduling a first set of uplink transmission occasions having a first density, determining that the first density of the first set of uplink transmission occasions is to be increased, transmitting, to the base station and based on the determination, a resource modification information request indicating a requested increase in the first density of uplink transmission occasions, and receiving, in response to the resource modification information request, a message increasing the first set of uplink transmission occasions to a second density that is greater than the first density.

An apparatus for wireless communication at a UE is described. The apparatus may include a processor, memory coupled with the processor, and instructions stored in the memory. The instructions may be executable by the processor to cause the apparatus to communicate with a base station according to a first uplink grant configuration scheduling a first set of uplink transmission occasions having a first density, determine that the first density of the first set of uplink transmission occasions is to be increased, transmit, to the base station and based on the determination, a resource modification information request indicating a requested increase in the first density of uplink transmission occasions, and receive, in response to the resource modification information request, a message increasing the first set of uplink transmission occasions to a second density that is greater than the first density.

Another apparatus for wireless communication at a UE is described. The apparatus may include means for communicating with a base station according to a first uplink grant configuration scheduling a first set of uplink transmission occasions having a first density, determining that the first density of the first set of uplink transmission occasions is to be increased, transmitting, to the base station and based on the determination, a resource modification information request indicating a requested increase in the first density of uplink transmission occasions, and receiving, in response to the resource modification information request, a message increasing the first set of uplink transmission occasions to a second density that is greater than the first density.

A non-transitory computer-readable medium storing code for wireless communication at a UE is described. The code may include instructions executable by a processor to communicate with a base station according to a first uplink grant configuration scheduling a first set of uplink transmission occasions having a first density, determine that the first density of the first set of uplink transmission occasions is to be increased, transmit, to the base station and based on the determination, a resource modification information request indicating a requested increase in the first density of uplink transmission occasions, and receive, in response to the resource modification information request, a message increasing the first set of uplink transmission occasions to a second density that is greater than the first density.

In some examples of the method, apparatuses, and non-transitory computer-readable medium described herein, transmitting the resource modification information request may include operations, features, means, or instructions for including, in the resource modification information request, an indication of a request that a HARQ process ID be based on an equation.

Some examples of the method, apparatuses, and non-transitory computer-readable medium described herein may further include operations, features, means, or instructions for identifying an offset value for the HARQ process ID based on the HARQ process ID being based on the equation, and including an indication of the offset value in the resource modification information request.

In some examples of the method, apparatuses, and non-transitory computer-readable medium described herein, identifying the offset value for the HARQ process ID may include operations, features, means, or instructions for determining the offset value based on a next available HARQ process ID.

In some examples of the method, apparatuses, and non-transitory computer-readable medium described herein, identifying the offset value for the HARQ process ID may include operations, features, means, or instructions for determining the offset value based on a total number of configured HARQ processes.

Some examples of the method, apparatuses, and non-transitory computer-readable medium described herein may further include operations, features, means, or instructions for determining the HARQ process ID based on the equation and the second density of the first set of uplink transmission occasions.

Some examples of the method, apparatuses, and non-transitory computer-readable medium described herein may further include operations, features, means, or instructions for receiving, via the message, an indication of a number of HARQ processes associated with the second density of the first set of uplink transmission occasions, and determining the HARQ process ID based on the equation and the number of HARQ processes.

In some examples of the method, apparatuses, and non-transitory computer-readable medium described herein, transmitting the resource modification information request may include operations, features, means, or instructions for including, in the resource modification information request, an indication of a request that a HARQ process ID be assigned at the UE.

Some examples of the method, apparatuses, and non-transitory computer-readable medium described herein may further include operations, features, means, or instructions for receiving, via the message and based on the request to assign the HARQ process ID at the UE, an indication that the HARQ process ID may be decoupled from a retransmission timer associated with at least one of the first set of uplink transmission occasions, and receiving, via the message and based on the request to assign the HARQ process ID at the UE, an indication that a timer for one or more of the first set of uplink transmission occasions may be set to a value of the retransmission timer.

Some examples of the method, apparatuses, and non-transitory computer-readable medium described herein may further include operations, features, means, or instructions for determining to request to assign respective HARQ process IDs at the UE for one or more first subsets of the first set of uplink transmission occasions, determining to request that respective HARQ process IDs for one or more second subsets of the first set of uplink transmission occasions be based on an equation, and including, in the resource modification information request, an indication of one or more first requests to assign respective HARQ process IDs for the one or more first subsets at the UE and an indication of one or more second requests that respective HARQ process IDs for the one or more second subsets be based on the equation.

In some examples of the method, apparatuses, and non-transitory computer-readable medium described herein, transmitting the resource modification information request may include operations, features, means, or instructions for including an indication of whether to reset a timer associated with one or more of the first set of uplink transmission occasions.

Some examples of the method, apparatuses, and non-transitory computer-readable medium described herein may further include operations, features, means, or instructions for receiving, via the message, an indication that the timer associated with one or more of the first set of uplink transmission occasions may be reset.

Some examples of the method, apparatuses, and non-transitory computer-readable medium described herein may further include operations, features, means, or instructions for receiving, via the message, an indication that the second density of the first set of uplink transmission occasions includes an additional subset of uplink transmission occasions.

In some examples of the method, apparatuses, and non-transitory computer-readable medium described herein, the message configures the UE with a same timer for each of the first set of uplink transmission occasions.

In some examples of the method, apparatuses, and non-transitory computer-readable medium described herein, transmitting the resource modification information request may include operations, features, means, or instructions for including, in the resource modification information request, a request for a decreased periodicity in the first set of uplink transmission occasions, where the request for the increase in the first density of uplink transmission occasions includes the request for the decreased periodicity.

In some examples of the method, apparatuses, and non-transitory computer-readable medium described herein, transmitting the resource modification information request may include operations, features, means, or instructions for including, in the resource modification information request, a request for an increase in a number of groups of repetitions of the first set of uplink transmission occasions, where the request for the increase in the first density of uplink transmission occasions includes the request for the increase in the number of groups of repetitions.

In some examples of the method, apparatuses, and non-transitory computer-readable medium described herein, different groups of repetitions may be associated with different uplink data.

In some examples of the method, apparatuses, and non-transitory computer-readable medium described herein, transmitting the resource modification information request may include operations, features, means, or instructions for including, in the resource modification information request, a request for an increase in a number of RBs for the first set of uplink transmission occasions or an increase in a MCS of the first set of uplink transmission occasions, where the request for the increase in the first density of uplink transmission occasions includes the request for the increase in the number of RBs or the request for the increase in the MCS.

Some examples of the method, apparatuses, and non-transitory computer-readable medium described herein may further include operations, features, means, or instructions for indicating one or more parameters of the resource modification information request using one or more parameters preconfigured by the base station, and receiving, via the message and based on the one or more parameters preconfigured by the base station, an indication of the increase of the first set of uplink transmission occasions to the second density.

Some examples of the method, apparatuses, and non-transitory computer-readable medium described herein may further include operations, features, means, or instructions for including, in the resource modification information request, an indication of a preconfigured grant configuration, where the indication of the preconfigured grant configuration includes the request for the increase in the first density of uplink transmission occasions, and receiving, via the message and based on the preconfigured grant configuration, an indication of the increase of the first set of uplink transmission occasions to the second density.

In some examples of the method, apparatuses, and non-transitory computer-readable medium described herein, transmitting the resource modification information request may include operations, features, means, or instructions for transmitting an uplink control information (UCI) message including the resource modification information request.

In some examples of the method, apparatuses, and non-transitory computer-readable medium described herein, transmitting the resource modification information request may include operations, features, means, or instructions for transmitting a first portion of an UCI message including an indication of the resource modification information request, and transmitting, based on transmitting the first portion, a second portion of the UCI message including the resource modification information request.

In some examples of the method, apparatuses, and non-transitory computer-readable medium described herein, the resource modification information request may be transmitted via medium access control (MAC) signaling.

In some examples of the method, apparatuses, and non-transitory computer-readable medium described herein, the message may be transmitted via MAC signaling or via physical layer signaling.

A method of wireless communication at a base station is described. The method may include communicating with a UE according to a first uplink grant configuration scheduling a first set of uplink transmission occasions for communications between the UE and the base station, the first set of uplink transmission occasions having a first density, receiving, from the UE, a resource modification information request indicating a requested increase in the first density of uplink transmission occasions, and transmitting, to the UE and in response to the resource modification information request, a message increasing the first set of uplink transmission occasions to a second density that is greater than the first density.

An apparatus for wireless communication at a base station is described. The apparatus may include a processor, memory coupled with the processor, and instructions stored in the memory. The instructions may be executable by the processor to cause the apparatus to communicate with a UE according to a first uplink grant configuration scheduling a first set of uplink transmission occasions for communications between the UE and the base station, the first set of uplink transmission occasions having a first density, receive, from the UE, a resource modification information request indicating a requested increase in the first density of uplink transmission occasions, and transmit, to the UE and in response to the resource modification information request, a message increasing the first set of uplink transmission occasions to a second density that is greater than the first density.

Another apparatus for wireless communication at a base station is described. The apparatus may include means for communicating with a UE according to a first uplink grant configuration scheduling a first set of uplink transmission occasions for communications between the UE and the base station, the first set of uplink transmission occasions having a first density, receiving, from the UE, a resource modification information request indicating a requested increase in the first density of uplink transmission occasions, and transmitting, to the UE and in response to the resource modification information request, a message increasing the first set of uplink transmission occasions to a second density that is greater than the first density.

A non-transitory computer-readable medium storing code for wireless communication at a base station is described. The code may include instructions executable by a processor to communicate with a UE according to a first uplink grant configuration scheduling a first set of uplink transmission occasions for communications between the UE and the base station, the first set of uplink transmission occasions having a first density, receive, from the UE, a resource modification information request indicating a requested increase in the first density of uplink transmission occasions, and transmit, to the UE and in response to the resource modification information request, a message increasing the first set of uplink transmission occasions to a second density that is greater than the first density.

In some examples of the method, apparatuses, and non-transitory computer-readable medium described herein, receiving the resource modification information request may include operations, features, means, or instructions for receiving, via the resource modification information request, an indication of a request that a HARQ process ID be based on an equation, and configuring the message based on the request that the HARQ process ID be based on the equation.

Some examples of the method, apparatuses, and non-transitory computer-readable medium described herein may further include operations, features, means, or instructions for receiving, via the resource modification information request, an offset value for the HARQ process ID based on the request that the HARQ process ID be based on the equation, and configuring the message based on the offset value.

In some examples of the method, apparatuses, and non-transitory computer-readable medium described herein, the offset value may be based on a next available HARQ process ID.

In some examples of the method, apparatuses, and non-transitory computer-readable medium described herein, the offset value may be based on a total number of configured HARQ processes.

In some examples of the method, apparatuses, and non-transitory computer-readable medium described herein, the HARQ process ID may be based on the equation and the second density of the first set of uplink transmission occasions.

Some examples of the method, apparatuses, and non-transitory computer-readable medium described herein may further include operations, features, means, or instructions for transmitting, via the message, an indication of a number of HARQ processes associated with the second density of the first set of uplink transmission occasions, where the HARQ process ID may be based on the equation and the number of HARQ processes.

In some examples of the method, apparatuses, and non-transitory computer-readable medium described herein, receiving the resource modification information request may include operations, features, means, or instructions for receiving, via the resource modification information request, an indication of a request to assign a HARQ process ID at the UE, and configuring the message based on the request to assign the HARQ process ID at the UE.

Some examples of the method, apparatuses, and non-transitory computer-readable medium described herein may further include operations, features, means, or instructions for transmitting, via the message and based on the request to assign the HARQ process ID at the UE, an indication that the HARQ process ID may be decoupled from a retransmission timer associated with at least one of the first set of uplink transmission occasions, and transmitting, via the message and based on the request to assign the HARQ process ID at the UE, an indication that a timer for one or more of the first set of uplink transmission occasions may be set to a value of the retransmission timer.

Some examples of the method, apparatuses, and non-transitory computer-readable medium described herein may further include operations, features, means, or instructions for receiving, via the resource modification information request, an indication of one or more first requests to assign respective HARQ process IDs at the UE for one or more first subsets of the first set of uplink transmission occasions and an indication of one or more second requests that respective HARQ process IDs for one or more second subsets of the first set of uplink transmission occasions be based on an equation, and configuring the message based on the one or more first requests and the one or more second requests.

In some examples of the method, apparatuses, and non-transitory computer-readable medium described herein, receiving the resource modification information request may include operations, features, means, or instructions for receiving, via the resource modification information request, an indication of whether to reset a timer associated with one or more of the first set of uplink transmission occasions.

Some examples of the method, apparatuses, and non-transitory computer-readable medium described herein may further include operations, features, means, or instructions for transmitting, via the message, an indication that the timer associated with one or more of the first set of uplink transmission occasions may be reset.

Some examples of the method, apparatuses, and non-transitory computer-readable medium described herein may further include operations, features, means, or instructions for transmitting, via the message, an indication that the second density of the first set of uplink transmission occasions includes an additional subset of uplink transmission occasions.

In some examples of the method, apparatuses, and non-transitory computer-readable medium described herein, the message configures the UE with a same timer for each of the first set of uplink transmission occasions.

In some examples of the method, apparatuses, and non-transitory computer-readable medium described herein, receiving the resource modification information request may include operations, features, means, or instructions for receiving, via the resource modification information request, a request for a decreased periodicity in the first set of uplink transmission occasions, where the request for the increase in the first density of uplink transmission occasions includes the request for the decreased periodicity.

In some examples of the method, apparatuses, and non-transitory computer-readable medium described herein, receiving the resource modification information request may include operations, features, means, or instructions for receiving, via the resource modification information request, a request for an increase in a number of groups of repetitions of the first set of uplink transmission occasions, where the request for the increase in the first density of uplink transmission occasions includes the request for the increase in the number of groups of repetitions.

In some examples of the method, apparatuses, and non-transitory computer-readable medium described herein, different groups of repetitions may be associated with different uplink data.

In some examples of the method, apparatuses, and non-transitory computer-readable medium described herein, receiving the resource modification information request may include operations, features, means, or instructions for receiving, via the resource modification information request, a request for an increase in a number of RBs for the first set of uplink transmission occasions or an increase in a MCS of the first set of uplink transmission occasions, where the request for the increase in the first density of uplink transmission occasions includes the request for the increase in the number of RBs or the request for the increase in the MCS.

Some examples of the method, apparatuses, and non-transitory computer-readable medium described herein may further include operations, features, means, or instructions for receiving one or more parameters of the resource modification information request based on one or more parameters preconfigured by the base station, and transmitting, via the message and based on the one or more parameters preconfigured by the base station, an indication of the increase of the first set of uplink transmission occasions to the second density.

Some examples of the method, apparatuses, and non-transitory computer-readable medium described herein may further include operations, features, means, or instructions for receiving, via the resource modification information request, an indication of a preconfigured grant configuration, where the preconfigured grant configuration includes the request for the increase in the first density of uplink transmission occasions, and transmitting, via the message and based on the preconfigured grant configuration, an indication of the increase of the first set of uplink transmission occasions to the second density.

In some examples of the method, apparatuses, and non-transitory computer-readable medium described herein, receiving the resource modification information request may include operations, features, means, or instructions for receiving an UCI message including the resource modification information request.

In some examples of the method, apparatuses, and non-transitory computer-readable medium described herein, receiving the resource modification information request may include operations, features, means, or instructions for receiving a first portion of an UCI message including an indication of the resource modification information request, and receiving, based on receiving the first portion, a second portion of the UCI message including the resource modification information request.

In some examples of the method, apparatuses, and non-transitory computer-readable medium described herein, the resource modification information request may be transmitted via MAC signaling.

In some examples of the method, apparatuses, and non-transitory computer-readable medium described herein, the message may be transmitted via MAC signaling or via physical layer signaling.

DETAILED DESCRIPTION

Figure 1:
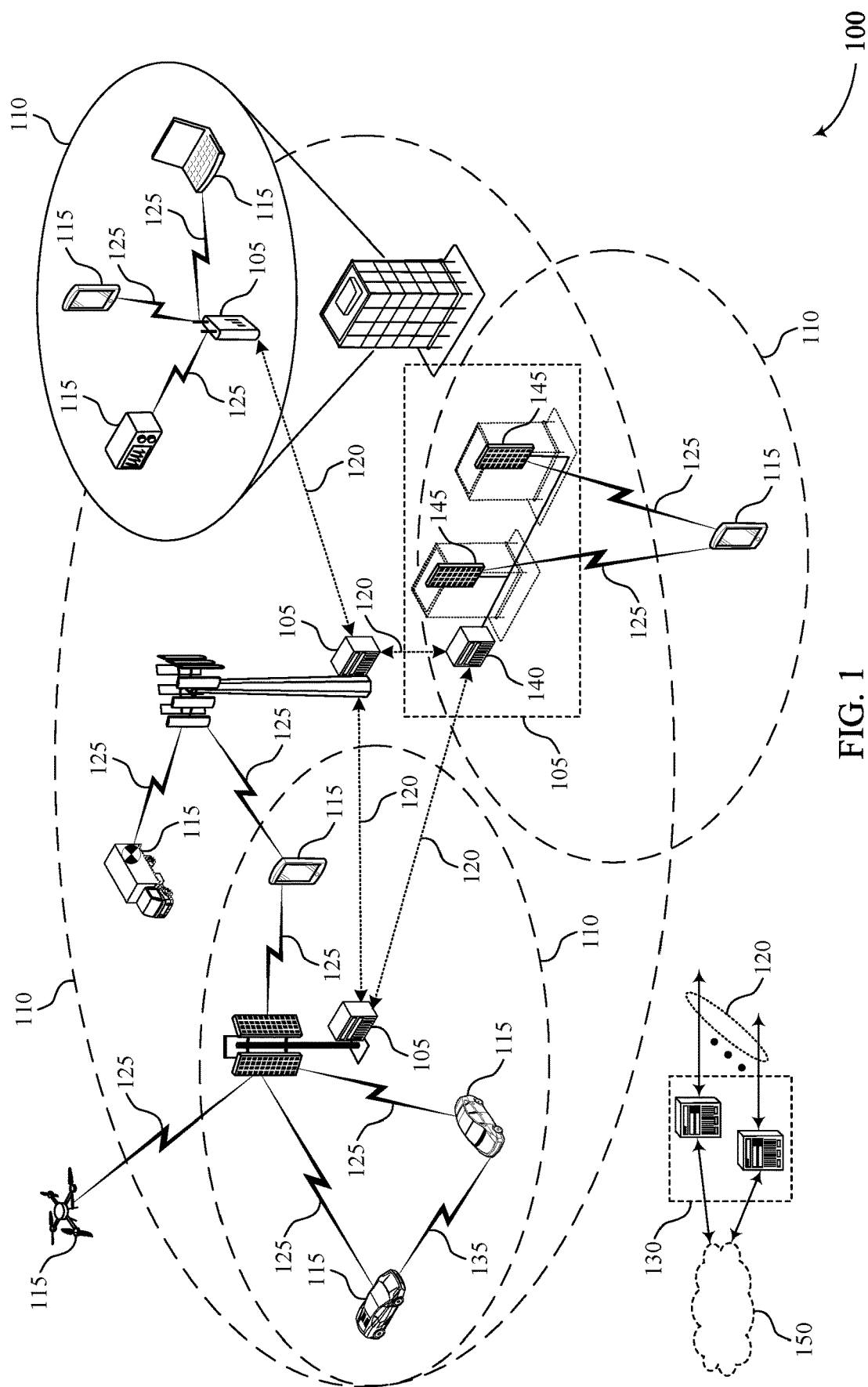
FIG. 1 illustrates an example of a wireless communications system that supports modifications to uplink grant configurations in accordance with aspects of the present disclosure.

A user equipment (UE) may communicate in the uplink with a base station using uplink transmission occasions based on a configured uplink grant (e.g., a semi-persistent grant) from the base station, where the uplink transmission occasions may have a first density. As described herein, a density may refer to a number of transmission occasions, or an amount of information transmitted via the transmission occasions, or a combination thereof. In some cases, a density may be associated with a throughput value. In some cases, the UE may experience or may expect to experience an increase (e.g., a burst) in uplink traffic, where the UE may be unable to transmit the increased uplink traffic using the existing configured uplink transmission occasions. For example, the UE may expect a burst of traffic associated with a higher number of uplink transmissions over a period of time (e.g., based on a UE-originated or driven application). In some cases, the UE may be unable to communicate a request for some aspects of resources for the increased uplink traffic. For example, the UE may be unable to transmit details regarding the higher number of uplink transmissions, such as information regarding uplink traffic patterns (e.g., density or periodicity) or regarding an amount of requested resources. Further, the base station may respond to the UE with signaling that may increase delays or control channel overhead. If the UE is delayed or unable to receive a grant for the increased uplink traffic, the UE may fail to communicate the uplink traffic, which may increase delays and decrease communication quality.

The present disclosure provides techniques for the UE to transmit a resource modification request (e.g., resource modification information) to the base station, where the resource modification request may request an increased density of uplink transmission occasions. For example, the UE may transmit a resource modification request to the base station based on an expected increase in uplink traffic (e.g., a higher number of uplink transmissions). The resource modification request may include a request for a decreased periodicity of uplink transmission occasions, an increased number of groups of repetitions for uplink transmission occasions, an increased number of resource blocks (RBs) for uplink transmission occasions, an increased modulation coding scheme (MCS) for uplink transmission occasions, or any combination thereof.

The resource modification request may also include information to support assignment of a hybrid automatic repeat request (HARQ) process identifier (ID) to one or more HARQ processes associated with the increased density of uplink transmission occasions. For example, the resource modification request may include an indication of a request from UE of a method or a procedure for determining one or more HARQ process IDs for uplink transmissions. In some cases, the resource modification request may also include information regarding an offset for a HARQ process ID equation, an indication of a request to reset one or more timers for the uplink transmission occasions, an indication of a request to configure one or more timers for the uplink transmission occasions, or any combination thereof.

The base station may receive the resource modification request and may transmit a message to the UE, which may indicate a modified or new uplink grant configuration for uplink transmission occasions. The UE may transmit one or more uplink transmissions (e.g., having a higher density or a higher number of uplink transmissions) to the base station based on the message and the modified or new uplink grant configuration.

Aspects of the disclosure are initially described in the context of wireless communications systems. Aspects of the disclosure are further illustrated by and described with reference to message configurations, signaling diagrams, a process flow, apparatus diagrams, system diagrams, and flowcharts that relate to modifications to uplink grant configurations.

FIG. 1 illustrates an example of a wireless communications system 100 that supports modifications to uplink grant configurations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate in the uplink with a base station 105 using uplink transmission occasions based on a configured uplink grant (e.g., a semi-persistent grant) from the base station 105, where the uplink transmissions may have a first density. In some cases, the UE 115 may experience or may expect to experience an increase (e.g., a burst) in uplink traffic, where the increased uplink traffic may be unable to be transmitted using the existing configured uplink transmission occasions. For example, the UE 115 may expect a burst of traffic associated with a higher number of uplink transmissions over a period of time (e.g., based on a UE-originated or driven application). In some cases, the UE 115 may be unable to transmit some details regarding the higher number of uplink transmissions, such as information about uplink traffic patterns (e.g., density or periodicity) or about an amount of requested resources. Further, the base station 105 may respond to the UE 115 with signaling that may increase delays or control channel overhead. If the UE 115 is delayed or unable to receive a grant for the increased uplink traffic, the UE 115 may fail to transmit the uplink traffic, which may increase delays and decrease communication quality.

The present disclosure provides techniques for the UE 115 to transmit a resource modification request (e.g., resource modification information) to the base station 105, where the resource modification request may request an increased density of uplink transmission occasions. The resource modification request may include a request for a decreased periodicity of uplink transmission occasions, an increased number of groups of repetitions for uplink transmission occasions, an increased number of RBs for uplink transmission occasions, or an increased MCS for uplink transmission occasions. The base station 105 may receive the resource modification request and may transmit a message to the UE 115, which may indicate a modified or new uplink grant configuration for uplink transmission occasions. The UE 115 may transmit one or more uplink transmissions (e.g., having a higher density or a higher number of uplink transmissions) to the base station 105 based on the message and the modified or new uplink grant configuration.

Figure 2:
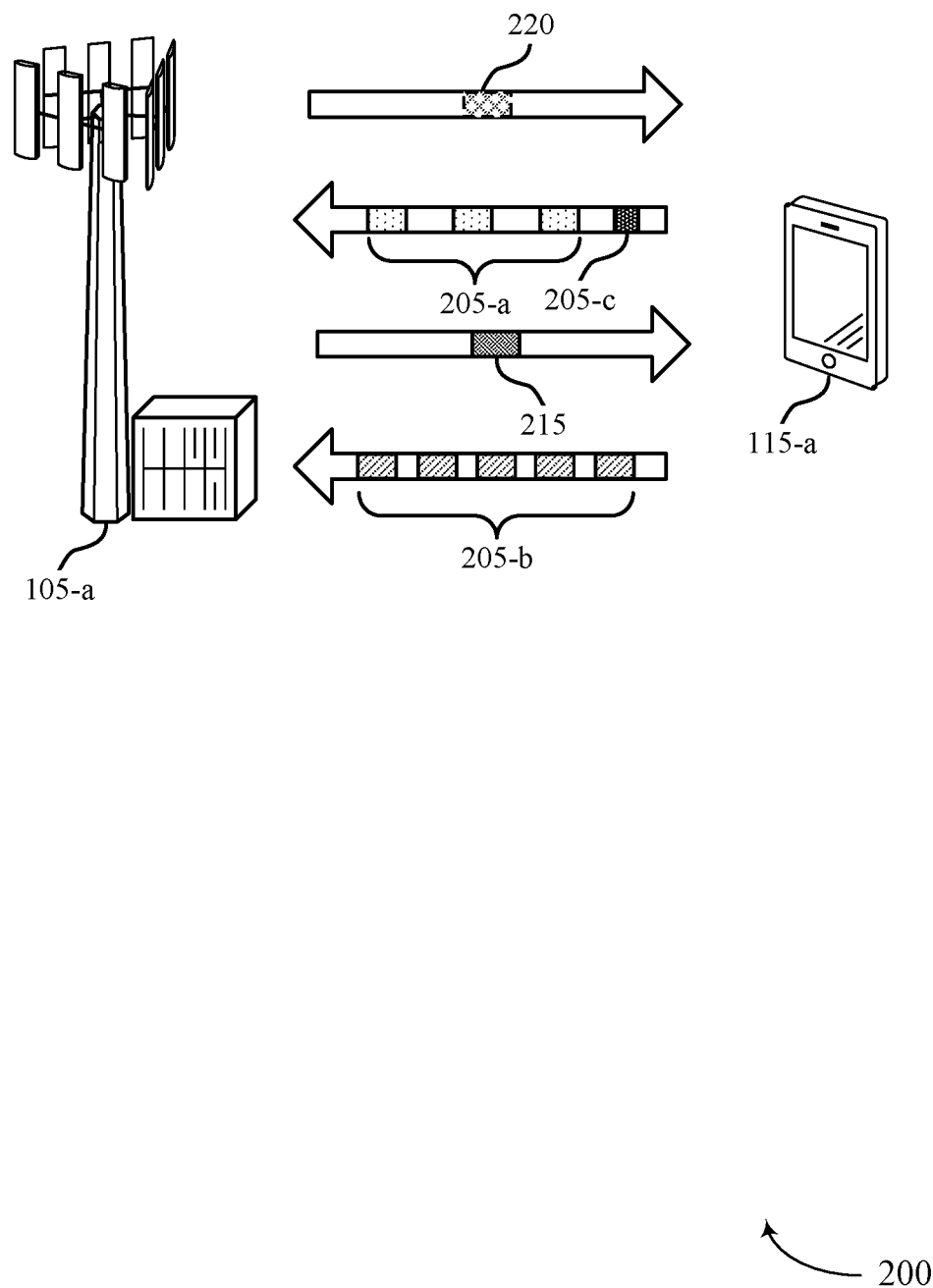
FIG. 2 illustrates an example of a wireless communications system that supports modifications to uplink grant configurations in accordance with aspects of the present disclosure.

FIG. 2 illustrates an example of a wireless communications system 200 that supports modifications to uplink grant configurations in accordance with aspects of the present disclosure. In some examples, wireless communications system 200 may implement aspects of wireless communication system 100. For example, wireless communications system 200 may include a base station 105-*a* and a UE 115-*a*, which may be examples of a base station 105 and a UE 115 described with respect to FIG. 1.

UE 115-*a* may communicate in the uplink with base station 105-*a* using uplink transmission occasions 205-*a* based on a configured uplink grant (e.g., a semi-persistent grant) from base station 105-*a*, where the uplink transmission occasions 205-*a* may have a first density. The communications between UE 115-*a* and base station 105-*a*, as described herein, may be associated with a discontinuous reception (DRX) mode or with a non-DRX mode. The configured uplink grant may represent a first type of grant (e.g., a Type 1 configured grant) or a second type of grant (e.g., a Type 2 configured grant). In the first type of grant, a grant configuration, one or more grant parameters, and a grant activation may be transmitted from base station 105-*a* via RRC signaling. In the second type of grant, a grant configuration may be transmitted from base station 105-*a* via RRC signaling, and one or more grant parameters and a grant activation may be transmitted from base station 105-*a* via one or more control messages (e.g., on a physical downlink control channel (PDCCH)). After receiving the activation of the second type of grant, UE 115-*a* may acknowledge the activation via a MAC control element (CE) transmitted to base station 105-*a*.

In some cases, UE 115-*a* may experience or may expect to experience an increase (e.g., a burst) in uplink traffic (e.g., based on a buffer status), where UE 115-*a* may be unable to transmit the increased uplink traffic using the existing configured uplink transmission occasions 205-*a*. For example, UE 115-*a* may expect a burst of traffic associated with a higher number of uplink transmissions for a period of time (e.g., based on a UE-originated or driven application). UE 115-*a* may, in some cases, transmit a scheduling request and a buffer status report (BSR) to base station 105-*a* to request more resources (e.g., a grant) for the higher number of uplink transmissions. However, a scheduling request may have a limited payload, and as such may be unable to convey some details regarding the higher number of uplink transmissions. Moreover, channel resources (e.g., physical uplink control channel (PUCCH)) resources for the scheduling request may be limited to an available logical channel. A BSR may report a buffer size of one or more logical channels, but may fail to include information about uplink traffic patterns (e.g., density or periodicity) or about an amount of requested resources.

In some cases, base station 105-*a* may respond to a scheduling request and BSR with a new configured grant using RRC signaling (e.g., based on a prior or immediate RRC configuration), which may increase delays. In some cases, base station 105-*a* may respond to a scheduling request and BSR with a new dynamic grant, which may increase control channel overhead (e.g., based on a frequency of new dynamic grants). If UE 115-*a* is delayed or unable to receive a grant for the increased uplink traffic, UE 115-*a* may fail to transmit the uplink traffic (e.g., the higher number of uplink transmissions), which may increase delays and decrease communication quality.

The present disclosure provides techniques for UE 115-*a* to transmit a resource modification request 210 (e.g., resource modification information) to base station 105-*a*, where the resource modification request may request an increased density of uplink transmission occasions 205. For example, UE 115-*a* may transmit a resource modification request 210 to base station 105-*a* based on an expected increase in uplink traffic (e.g., a higher number of uplink transmissions). The resource modification request 210 may include a request for a decreased periodicity of uplink transmission occasions 205, an increased number of groups of repetitions for uplink transmission occasions 205, an increased number of RBs for uplink transmission occasions 205, or an increased modulation coding scheme MCS for uplink transmission occasions 205. The resource modification request 210 may also include information to support assignment of a HARQ process ID to one or more HARQ processes, for example, associated with the increased density of uplink transmission occasions 205. The base station may receive the resource modification request 210 and may transmit a message 215 to UE 115-*a*, which may indicate a modified or new uplink grant configuration for uplink transmission occasions 205-*b*. UE 115-*a* may transmit one or more uplink transmissions (e.g., having a higher density or a higher number of uplink transmissions) to base station 105-*a* based on the message 215 and the modified or new uplink grant configuration.

UE 115-*a* may transmit the resource modification request 210 via MAC signaling (e.g., a MAC CE) or via physical layer signaling (e.g., via uplink control information (UCI)). If the resource modification request 210 is transmitted via UCI, UE 115-*a* may transmit the resource modification request 210 via a single UCI message or via a two-part UCI message. The resource modification request 210 may include an indication of a request from UE 115-*a* for an increased density of uplink transmission occasions 205 in the form of a request for a decreased periodicity, an increased number of groups of repetitions, an increased number of RBs, or an increased MCS for the uplink transmission occasions 205.

In some cases, prior to transmission of the resource modification request 210, base station 105-*a* may preconfigure a range of values for a given parameter (e.g., periodicity) associated with the density of uplink transmission occasions 205-*a*. Similarly, base station 105-*a* may preconfigure an uplink grant configuration to have one or more parameters associated with the density of uplink transmission occasions 205-*a*. Base station 105-*a* may indicate the preconfigured parameters or preconfigured uplink grant configuration to UE 115-*a* via a configuration message 220 (e.g., via RRC signaling). In such cases, UE 115-*a* may select one or more of the preconfigured parameters or a preconfigured uplink grant configuration and may indicate the one or more preconfigured parameters or the uplink grant configuration to base station 105-*a* via the resource modification request 210.

The resource modification request 210 may also include an indication of a request of a method or a procedure for determining one or more HARQ process IDs for uplink transmission occasions 205-*b*. For example, the resource modification request 210 may include an indication of a request from UE 115-*a* to determine one or more HARQ process IDs by assignment at UE 115-*a*, based on a HARQ process ID equation, or both. In some cases, the resource modification request may also include information regarding an offset for the HARQ process ID equation, an indication of a request to reset one or more timers for uplink transmission occasions 205-*b*, an indication of a request to configure one or more timers for uplink transmission occasions 205-*b*, or any combination thereof.

The message 215 from base station 105-*a* (e.g., in response to the resource modification request 210) may be transmitted via RRC signaling, MAC signaling (e.g., via a MAC CE), or physical layer signaling (e.g., via downlink control information (DCI)). If the resource modification request 210 includes an indication of one or more preconfigured parameters, base station 105-*a* may select one or more of the preconfigured parameters and indicate the selected parameter(s) to UE 115-*a* via the message (e.g., via MAC or physical layer signaling). In some cases, if the resource modification request 210 includes an indication of a preconfigured uplink grant configuration to be activated, base station 105-*a* may activate the preconfigured grant via the message 215 (e.g., via MAC or physical layer signaling).

In a first example, the resource modification request 210 may indicate a request for a decreased periodicity for uplink transmission occasions 205. Base station 105-*a* may decrease the periodicity of uplink transmission occasions 205-*b* based on the resource modification request 210, and may indicate the decrease via message 215. The request for the decreased periodicity may indicate a periodicity selected by UE 115-*a* or may indicate a preconfigured periodicity (e.g., by indicating a grant configuration associated with the preconfigured periodicity). The message 215 from base station 105-*a* may indicate a modification to the grant configuration for uplink transmission occasions 205-*a*, or in some cases, may indicate an additional grant configuration for uplink transmission occasions 205-*b* (e.g., such that UE 115-*a* may be configured with multiple grant configurations). If UE 115-*a* uses an equation to determine one or more HARQ process IDs for uplink transmission occasions 205-*b*, the equation may be modified based on a decreased periodicity indicated by base station 105-*a* via message 215.

In some cases, if base station 105-*a* decreases the periodicity of uplink transmission occasions 205-*b*, two or more active HARQ processes may be associated a same HARQ process ID, which may delay transmission for one or more HARQ processes assigned the same HARQ process ID. For example, a configured grant timer may be set or started when UE 115-*a* transmits a first uplink transmission in a first HARQ process associated with a first HARQ process ID. When the configured grant timer expires, the HARQ process ID may be available for another uplink transmission. However, in some cases when the periodicity of uplink transmission occasions 205-*b* is decreased, a new HARQ process may be associated with a HARQ process ID that has not yet expired (e.g., based on an associated configured grant timer). Accordingly, in one example, UE 115-*a* may request (e.g., via the resource modification request 210) to assign a HARQ process ID at UE 115-*a* and may avoid repeating a same HARQ process ID by selecting different HARQ process IDs from a same pool. In another example, UE 115-*a* may request to use a HARQ process ID equation to determine HARQ process IDs and may request a HARQ process ID offset for the equation (e.g., via the resource modification request 210), where the offset may be configured such that a new HARQ process ID may avoid overlapping with other active HARQ process IDs.

In a second example, the resource modification request 210 may indicate a request for an increased number of groups of repetitions (e.g., RepK groups) for uplink transmission occasions 205-*b*. For example, a group of repetitions of a first uplink transmission occasion may include a predefined number of repetitions of the first uplink transmission occasion (e.g., three repetitions of the uplink transmission occasion). Base station 105-*a* may increase the number of groups of repetitions of uplink transmission occasions 205-*b* based on the resource modification request 210, and may indicate the increase via message 215. The request for an increased number of groups of repetitions may, for example, request formation of another group of repetitions of a second uplink transmission occasion that is associated with different data than the first uplink transmission occasion. In some cases, each group of repetitions may be associated with a group number and with a number of repetitions (e.g., a RepK value). If UE 115-*a* uses an equation to determine one or more HARQ process IDs for uplink transmission occasions 205-*b*, the equation may be modified based on an increased number of groups of repetitions indicated by base station 105-*a* via message 215. In some cases, UE 115-*a* may begin using the increased number of groups of repetitions on a next uplink transmission occasion 205-*c* following reception of the message 215.

In other examples, the resource modification request 210 may indicate a request for an increased number of RBs, an increased frequency allocation, or an increased MCS associated with uplink transmission occasions 205-*b*. Base station 105-*a* may increase the number of RBs, frequency allocation, or MCS of uplink transmission occasions 205-*b* based on the resource modification request 210, and may indicate the increase via message 215. In some cases, UE 115-*a* may begin using the increased number of RBs, frequency allocation, or MCS on a next uplink transmission occasion 205 following reception of the message 215.

Figure 3A:
FIGS. 3A and 3B illustrate respective examples of message configurations that support modifications to uplink grant configurations in accordance with aspects of the present disclosure.
Figure 3B:
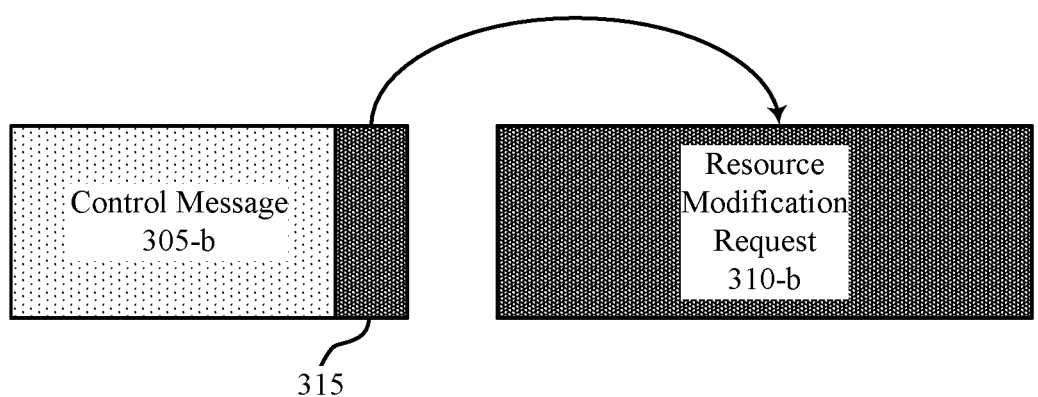

FIGS. 3A and 3B illustrate respective examples of message configurations 301 and 302 that support modifications to uplink grant configurations in accordance with aspects of the present disclosure. In some examples, message configurations 301 and 302 may implement or be implemented by aspects of wireless communications system 100 or 200. For example, message configuration 301 or 302, or a combination thereof, may be used by a UE 115 in communication with a base station 105, where the UE 115 and the base station 105 may be examples of a UE 115 and a base station 105 described with reference to FIGS. 1 and 2. As described herein with reference to FIG. 2, the UE 115 may communicate with the base station 105 in the uplink according to a grant configuration for uplink transmission occasions, and the UE 115 may transmit a resource modification request 310 to the base station 105 to request an increased density of uplink transmission occasions.

The UE 115 may transmit the resource modification request 310 to the base station 105 via MAC signaling (e.g., a MAC CE) or via physical layer signaling (e.g., via a control message 305, such as a UCI message). Additionally or alternatively, the resource modification request 310 may be transmitted via a resource modification information occasion (e.g., configured resources, similar to a wake-up signal occasion). Message configurations 301 and 302 may represent respective configurations for transmitting the resource modification request 310 from the UE 115 to the base station 105 via a control message 305. In the example illustrated by FIG. 3A, the UE 115 may transmit a resource modification request 310-*a* via a control message 305-*a*. For example, the UE 115 may transmit resource modification request 310-*a* using an existing configuration of control message 305-*a* (e.g., a UCI message), based on the grant configuration for the uplink transmission occasions. In some cases, transmitting resource modification request 310-*a* via control message 305-*a* may increase a payload size of control message 305-*a*.

In the example illustrated by FIG. 3B, the UE 115 may transmit a resource modification request 310-*b* via a two-part control message 305. In some cases, a first part or payload of the two-part control message 305 may include control message 305-b, which may be associated with a fixed payload size. Control message 305-b may include an indicator 315 associated with or pointing to a second part or payload of the two-part control message 305. For example, indicator 315 may indicate to the base station 105 that a second payload of the two-part control message 305 is to follow the first payload. In some cases, the indicator may indicate a size or other aspect of the second payload. The second payload may include resource modification request 310-b, and may have a payload size corresponding to the resource modification request 310-b.

A resource modification request 310 (e.g., as illustrated by FIG. 3A or FIG. 3B) may include an indication of a request from the UE 115 for an increased density of uplink transmission occasions. The request for the increased density may include a request for a decreased periodicity of the uplink transmission occasions, an increased number of groups of repetitions for the uplink transmission occasions, an increased number of RBs for the uplink transmission occasions, an increased MCS, or any combination thereof, for the uplink transmission occasions. For example, the UE 115 may determine whether to request a decreased periodicity, an increased number of repetition groups, an increased number of RBs, or an increased MCS, or a combination thereof, and may include the request in the resource modification request 310.

The resource modification request 310 may also include an indication of a request from the UE 115 of a method or a procedure for determining one or more HARQ process IDs for the increased density of uplink transmission occasions. For example, the resource modification request 310 may include an indication of a request from the UE 115 to determine one or more HARQ process IDs based on a HARQ process ID equation, to assign the one or more HARQ process IDs at the UE 115, or both. In some cases, the resource modification request 310 may also include a requested offset for the HARQ process ID equation, an indication of a request to reset one or more timers for the increased density of uplink transmission occasions, an indication of a request to configure one or more timers for the increased density of uplink transmission occasions, or any combination thereof.

The UE 115 may determine one or more parameters of the resource modification request 310 as described herein and may include respective indications of the one or more determined parameters. For example, the UE 115 may include, for each of the one or more determined parameters, a value generated by the UE 115, an index to a value preconfigured by the base station 105, or an index to a grant configuration preconfigured by the base station 105. In some cases, if the resource modification request 310 includes one or more indices to preconfigured values or to one or more preconfigured grant configurations, the base station 105 may respond to the resource modification request 310 using MAC or physical layer signaling (e.g., a DCI message or a MAC CE) to change preconfigured parameters or activate a preconfigured grant configuration in accordance with the request for the increased density of uplink transmissions.

As described herein with reference to FIG. 2, the base station may receive the resource modification request 310 and may transmit a message to the UE 115, which may indicate a modified or new uplink grant configuration for uplink transmission occasions. The UE 115 may transmit one or more uplink transmissions (e.g., having a higher density or a higher number of uplink transmissions) to the base station 105 based on the message and the modified or new uplink grant configuration.

Figure 4A:
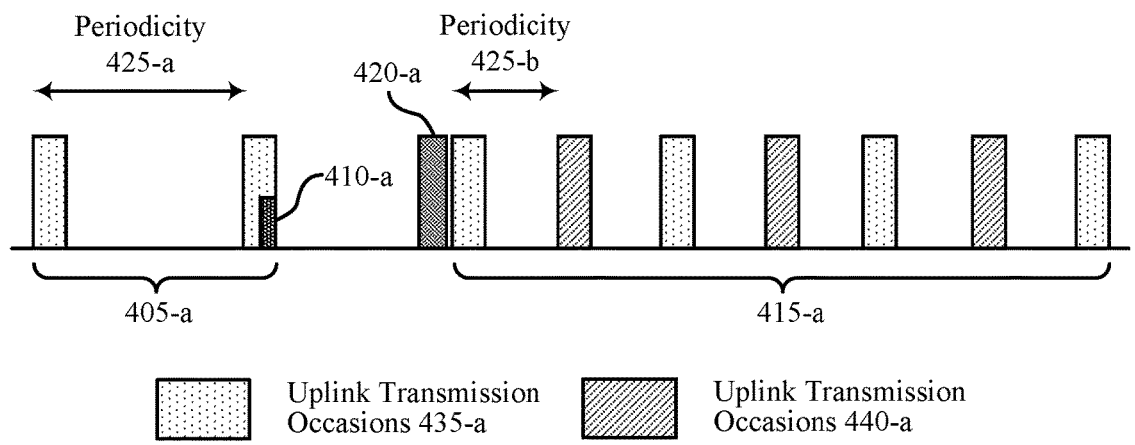
FIGS. 4A, 4B, and 4C illustrate respective examples of signaling diagrams that support modifications to uplink grant configurations in accordance with aspects of the present disclosure.
Figure 4B:
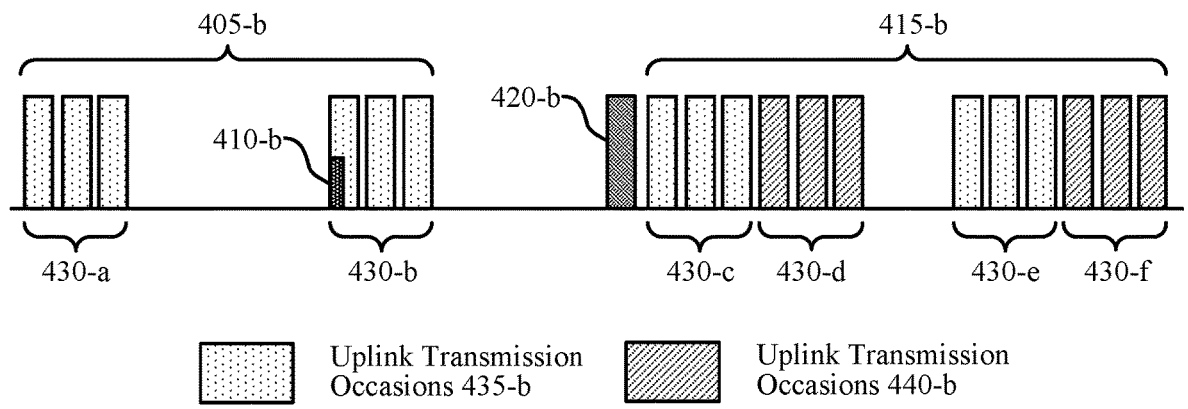
Figure 4C:
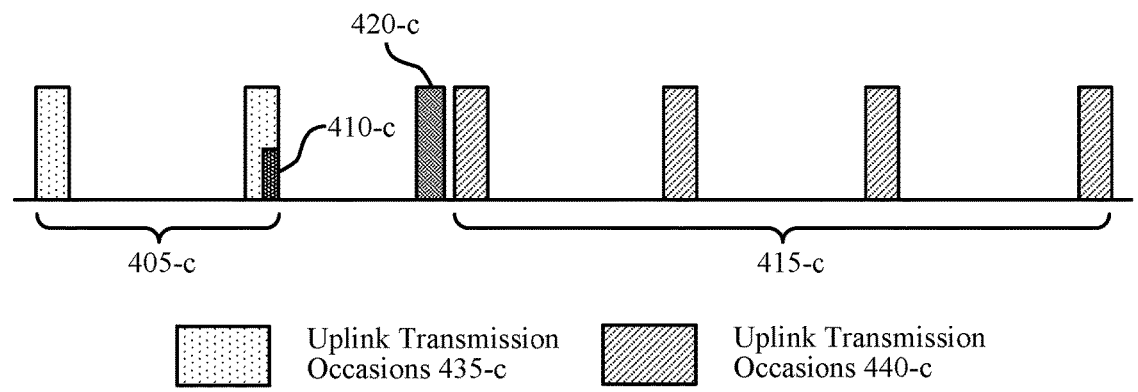

FIGS. 4A, 4B, and 4C illustrate respective examples of signaling diagrams 401, 402, and 403 that support modifications to uplink grant configurations in accordance with aspects of the present disclosure. In some examples, signaling diagrams 401, 402, and 403 may implement or be implemented by aspects of wireless communications system 100 or 200. For example, signaling diagram 401, 402, or 403, or a combination thereof, may be used by a UE 115 in communication with a base station 105, where the UE 115 and the base station 105 may be examples of a UE 115 and a base station 105 described with reference to FIGS. 1-3.

As described herein with reference to FIG. 2, the UE 115 may communicate with the base station 105 in the uplink according to a grant configuration for uplink transmission occasions 405, and the UE 115 may transmit a resource modification request 410 to the base station 105 to request an increased density of uplink transmission occasions 405. The base station 105 may respond to the resource modification request 410 with a message 420 indicating a modified or new uplink grant configuration for uplink transmission occasions 415. The UE 115 may transmit one or more uplink transmissions (e.g., having a higher density or a higher number of uplink transmissions) to the base station 105 based on the message 420 and the modified or new uplink grant configuration.

In a first example illustrated by FIG. 4A, the UE 115 may request an increased density of uplink transmission occasions 405-a by requesting a decreased periodicity 425 of uplink transmission occasions 405-a, where uplink transmission occasions 405-a may include uplink transmission occasions 435-a based on the configured grant. For example, uplink transmission occasions 405-a may be associated with a first periodicity 425-a, which may be associated with a first density of uplink transmission occasions 405-a. The UE 115 may transmit a resource modification request 410-a to the base station 105 (e.g., via an uplink transmission occasion 405-a), indicating a requested periodicity 425-b (e.g., a decreased periodicity 425-b) determined by the UE 115 or indicating a preconfigured grant associated with a decreased periodicity 425-b.

Resource modification request 410-a may also include an indication of a request from the UE 115 to determine one or more HARQ process IDs for uplink transmission occasions 415-a based on a HARQ process ID equation or by assigning the one or more HARQ process IDs at the UE 115, or a combination thereof. The base station 105 may respond to resource modification request 410-a with a message 420-a, which may include a modified grant or a new grant for uplink transmission occasions 415-a, in order to achieve the decreased periodicity 425-b. Uplink transmission occasions 415-a may include uplink transmission occasions 435-a and uplink transmission occasions 440-a, where uplink transmission occasions 440-a may be based on the modified grant or the new grant. Message 420-a may also indicate a new number of HARQ processes (e.g., an increased number of HARQ processes) associated with uplink transmission occasions 415-a.

If the UE 115 requests to use the HARQ process ID equation to determine the one or more HARQ process IDs (e.g., and the base station 105 indicates to use the equation via message 420-a), the UE 115 may, for example, use an equation such as equation (1) to determine the one or more HARQ process IDs:

$$\text{ID} = [\text{floor}(\text{symbol}/\text{periodicity}_{new})] \text{modulo} [\text{nrofHARQProcesses}] \quad (1)$$

where ID represents a respective HARQ process ID of the one or more HARQ process IDs, floor represents a rounding operation such as a floor rounding operation, symbol represents a current symbol (e.g., number of a symbol) of a transmission associated with the respective HARQ process ID, periodicity$_{new}$ represents the decreased periodicity of uplink transmission occasions 415-a (e.g., periodicity 425-b), modulo represents a modulo operation, and nrofHARQProcesses represents a number of HARQ processes configured for uplink transmission occasions 415-a (e.g., a new number of HARQ processes or a same number of HARQ processes).

In some cases, if the base station 105 decreases the periodicity of uplink transmission occasions 415-a, two or more HARQ processes may be associated with a same HARQ process ID, for example, based on a configured grant timer as described with reference to FIG. 2. Associating two or more HARQ processes with the same HARQ process ID may result in delaying a second or third HARQ process (e.g., and associated transmission) associated with the same HARQ process ID. In one example, the UE 115 may request (e.g., via resource modification request 410-a) to assign a HARQ process ID at the UE 115 and may avoid repeating a same HARQ process ID by assigning different HARQ process IDs from a same pool of HARQ process IDs. In some cases, the UE 115 may indicate an assigned HARQ process ID via UCI or other uplink transmission. In another example, the UE 115 may request to use the HARQ process ID equation and may request a HARQ process ID offset for the equation (e.g., via resource modification request 410-a), where the offset may be configured such that a new HARQ process ID may avoid overlapping with other active HARQ process IDs. In such cases, the UE 115 may, for example, use an equation such as equation (2) to determine the one or more HARQ process IDs using the HARQ process ID offset:

$$ID=[floor(symbol/periodicity_{new})]modulo[nrofHARQProcesses]+offset \quad (2)$$

where ID represents a respective HARQ process ID of the one or more HARQ process IDs, floor represents a rounding operation such as a floor rounding operation, symbol represents a current symbol (e.g., number of a symbol) of a transmission associated with the respective HARQ process ID, periodicity$_{new}$ represents the decreased periodicity of uplink transmission occasions 415-a (e.g., periodicity 425-b), modulo represents a modulo operation, nrofHARQProcesses represents a number of HARQ processes configured for uplink transmission occasions 415-a (e.g., a new number of HARQ processes or a same number of HARQ processes), and off set represents the HARQ process ID offset.

In some cases, the HARQ process ID offset may be determined by one or more predetermined rules available to the base station 105 and the UE 115. In a first example, the HARQ process ID offset may be configured such that a first HARQ process ID of the one or more HARQ process IDs may be determined (e.g., by the equation) to be a next available HARQ process ID. For example, if a most recent HARQ process ID has a value of '0,' the HARQ process ID offset may be configured such that the first HARQ process ID of the one or more HARQ process IDs may have a value of '1.' In a second example, the base station may configure a second grant for uplink transmission occasions 415-a and the HARQ process ID offset may be based on a total number of configured HARQ processes (e.g., between the two grants). For example, the HARQ process ID offset may be based on an equation such as equation (3):

$$offset=Processes_{configured}/2+1 \quad (3)$$

where offset represents the HARQ process ID offset and Processes$_{configured}$ represents the total number of configured HARQ processes.

If the UE 115 requests (e.g., via resource modification request 410-a) to assign the one or more HARQ process IDs, the base station may support the HARQ process ID assignment at the UE 115 by decoupling a retransmission timer for uplink transmission occasions 415-a and a functionality for assigning HARQ process IDs. The base station may further set a configured grant timer for uplink transmission occasions 415-a to a value of the retransmission timer.

In some cases, the UE 115 may request (e.g., and the base station 105 may configure) for some uplink transmission occasions 415-a to be associated with a HARQ process ID equation and for some uplink transmission occasions 415-a to be associated with one or more HARQ process IDs assigned at the UE 115. For example, the base station 105 may configure multiple grants (e.g., including the original configured grant) to achieve the decreased periodicity, where one or more of the configured grants may be associated with a HARQ process ID equation and one or more of the configured grants may be associated with assigning the HARQ process ID at the UE 115 (e.g., which may be referred to as a mixed HARQ process ID assignment mode).

In some cases, the UE 115 may request (e.g., via resource modification request 410-a) to reset a configured grant timer on one or more HARQ process IDs and base station 105 may reset the configured grant timer. For example, the base station 105 may activate a configured grant sharing a same HARQ process pool as the one or more HARQ process IDs, the base station 105 may reset the configured grant timer for the one or more HARQ process IDs to a new value (e.g., in order to account for the decreased periodicity 425-b). In some cases, if the base station 105 activates multiple configured grants (e.g., a second configured grant) to achieve the decreased periodicity 425-b, the base station 105 may also configure or reset a configured grant timer to a same value across each of the multiple configured grants.

In a second example illustrated by FIG. 4B, a resource modification request 410-b may indicate a request for an increased number of groups 430 of repetitions (e.g., RepK groups) for uplink transmission occasions 405-b, where each group 430 may be associated with a given group ID. Uplink transmission occasions 405-b may include uplink transmission occasions 435-b based on the configured grant. The base station 105 may respond to resource modification request 410-b with a message 420-b, which may include a modified grant or a new grant for uplink transmission occasions 415-b. In some cases, the UE 115 may transmit the resource modification request 410-b via a group 430 of repetitions of uplink transmission occasions 405-b, such as via a group 430-b or via a group 430-a. Group 430-a of uplink transmission occasions 405-b may include a predefined number of repetitions of a first uplink transmission occasion 405-b (e.g., three repetitions of the uplink transmission occasion 405-b) and group 430-b may similarly include a number of repetitions of a second uplink transmission occasion 405-b. In some cases, groups 430-a and 430-b may be associated with a same group ID and with different HARQ process IDs.

The request for an increased number of groups 430 (e.g., group IDs) of repetitions may, for example, result in formation of groups 430-d and 430-f (e.g., within uplink transmission occasions 415-b), which may be associated with a different group ID than groups 430-a and 430-b. Groups 430-c and 430-e (e.g., within uplink transmission occasions 415-b), in some cases, may be associated with a same group ID as groups 430-*a* and 430-*b*. Uplink transmission occasions 415-*b* may include uplink transmission occasions 435-*b* and uplink transmission occasions 440-*b*, where uplink transmission occasions 440-*b* may be based on the modified grant or the new grant. The base station 105 may form groups 430-*d* and 430-*f* (e.g., in response to resource modification request 410-*b*) and may indicate the new group ID and associated groups 430 to the UE 115 via message 420-*b*. In some cases, the UE 115 may begin using the increased number of groups 430 of repetitions on a next uplink transmission occasion 415-*b* following reception of the message 420-*b*. Different groups 430 may be associated with different uplink data, and may therefore increase uplink throughput, which may increase the density of uplink transmission occasions 415-*b*.

If the UE 115 uses an equation to determine one or more HARQ process IDs for uplink transmission occasions 415-*b*, the equation may be modified based on an increased number of groups 430 of repetitions indicated by the base station 105 via message 420-*b*. For example, the UE 115 may use an equation such as equation (4) to determine the one or more HARQ process IDs:

$$ID=[floor(symbol/periodicity/groups)]modulo[nrof\text{-}HARQProcesses] \qquad (4)$$

where ID represents a respective HARQ process ID of the one or more HARQ process IDs, floor represents a rounding operation such as a floor rounding operation, symbol represents a current symbol (e.g., number of a symbol) of a transmission associated with the respective HARQ process ID, periodicity represents the periodicity of uplink transmission occasions 415-*b*, groups represents a number of groups 430 (e.g., group IDs) configured for the UE 115, modulo represents a modulo operation, and nrofHARQProcesses represents a number of HARQ processes configured for uplink transmission occasions 415-*b* (e.g., a new number of HARQ processes or a same number of HARQ processes). In some cases, equation (4) may also include a HARQ process ID offset, as described herein with reference to FIG. 3A.

In a third example illustrated by FIG. 4C, a resource modification request 410-*c* may indicate a request for an increased number of RBs, frequency allocation, or an MCS associated with uplink transmission occasions 405-*c*, which may include uplink transmission occasions 435-*c* based on the configured grant. The base station 105 may increase the number of RBs, the frequency allocation, or the MCS of uplink transmission occasions 415-*c* based on the resource modification request 410-*c*, and may indicate the increase via message 420-*c* (e.g., a new or modified grant). In some cases, the UE 115 may begin using the increased number of RBs, frequency allocation, or MCS on a next uplink transmission occasions 415-*c* following reception of message 420-*c*. Uplink transmission occasions 415-*c* may include uplink transmission occasions 440-*c*, which may be based on the modified grant or the new grant.

Figure 5:
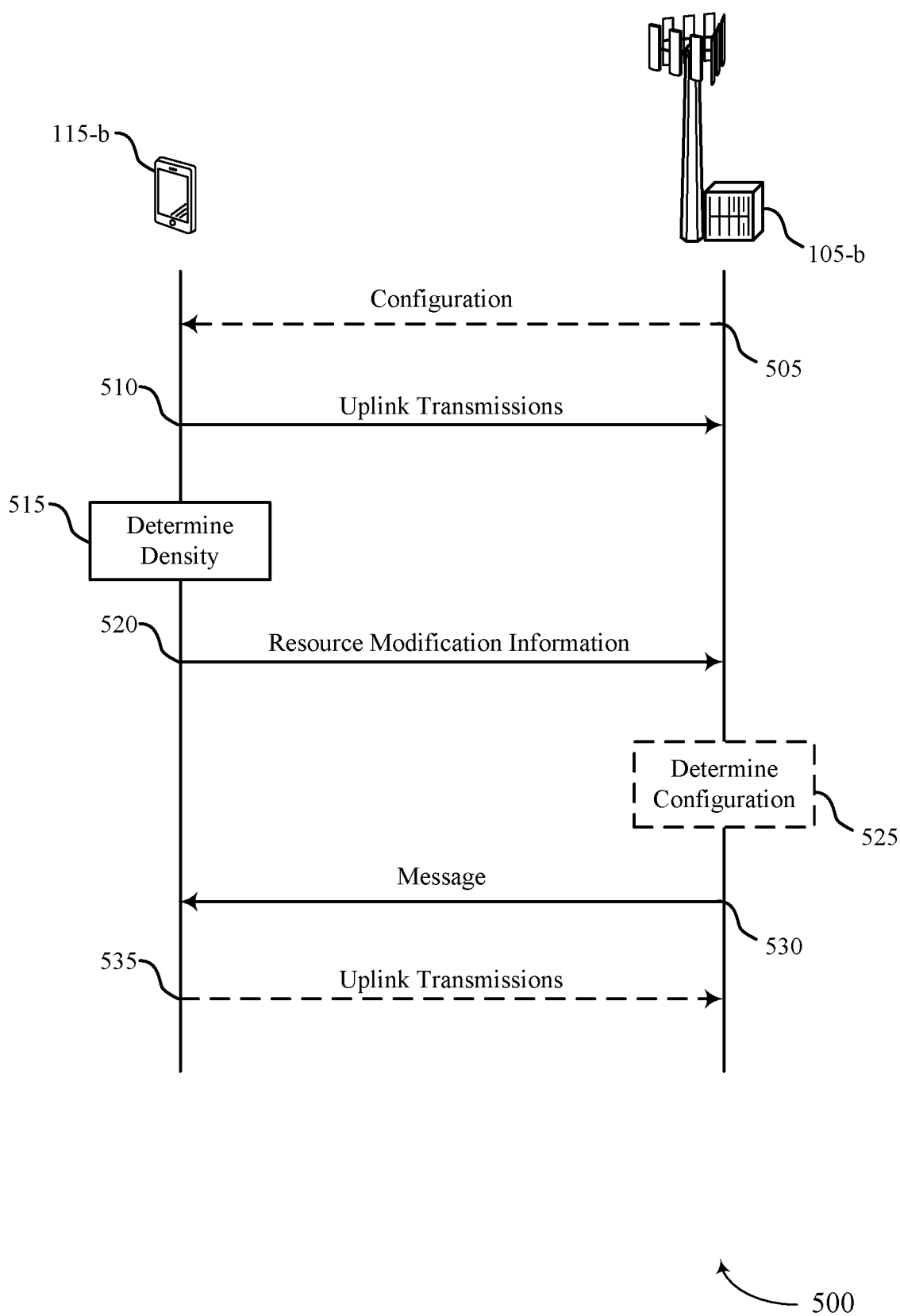
FIG. 5 illustrates an example of a process flow that supports modifications to uplink grant configurations in accordance with aspects of the present disclosure.

FIG. 5 illustrates an example of a process flow 500 that supports modifications to uplink grant configurations in accordance with aspects of the present disclosure. In some examples, process flow 500 may implement or be implemented by aspects of wireless communications system 100 or 200. For example, process flow 500 may include or be implemented by a base station 105-*b* and a UE 115-*b*, which may represent examples of a base station 105 and a UE 115 described with reference to FIGS. 1-4. As described with reference to FIGS. 2-4, UE 115-*b* and base station 105-*b* may implement techniques for increasing a density of uplink transmissions that are based on a configured grant.

In the following description of process flow 500, the operations between UE 115-*b* and base station 105-*b* may be transmitted in a different order than the order shown, or the operations performed by UE 115-*b* and base station 105-*b* may be performed in different orders or at different times. For example, specific operations may also be left out of process flow 500, or other operations may be added to process flow 500. Although UE 115-*b* and base station 105-*b* are shown performing the operations of process flow 500, some aspects of some operations may also be performed by one or more other wireless devices.

At 505, in some cases, base station 105-*b* may transmit, to UE 115-*b* a configuration indicating one or more preconfigured parameters or uplink grant configurations. For example, base station 105-*b* may preconfigure a range of values for a given parameter (e.g., periodicity) associated with the density of uplink transmission occasions for UE 115-*b*. Similarly, base station 105-*b* may preconfigure an uplink grant configuration to have one or more parameters associated with the density of the uplink transmission occasions.

At 510, UE 115-*b* and base station 105-*b* may communicate according to a first uplink grant configuration that schedules a first set of uplink transmission occasions having a first density. For example, UE 115-*b* may transmit, to base station 105-*b*, one or more uplink transmissions using the first set of uplink transmission occasions.

At 515, UE 115-*b* may determine that the first density of the first set of uplink transmission occasions is to be increased. For example, UE 115-*b* may determine that uplink traffic is increased, or is expected to increase, for a period of time and that an increase in the first density of uplink transmission occasions may support transmission of the increased uplink traffic. Additionally or alternatively, UE 115-*b* may determine that UE 115-*b* is unable to transmit the increased uplink traffic using the first density of the first set of uplink transmission occasions.

At 520, UE 115-*b* may transmit, to base station 105-*b* and based on the determination to increase the first density, a resource modification information request indicating a requested increase in the first density of uplink transmission occasions. As described herein, the resource modification information request may include an indication of a requested decrease in periodicity, increase in repetition groups, increase in RBs, or increase in MCS, or any combination thereof, for the first set of uplink transmission occasions. In some cases, the request for increased density of the uplink transmission occasions may include one or more preconfigured parameters or an indication of a preconfigured uplink grant configuration. The resource modification request may also include an indication of a method or procedure for determining one or more HARQ process IDs for the increased density of uplink transmission occasions (e.g., using an equation or via assignment at UE 115-*b*), and may include other HARQ process information. UE 115-*b* may transmit the resource modification information request via MAC signaling or via physical layer signaling (e.g., via a UCI message). In some cases, when transmitting the resource modification information request via UCI, UE 115-*b* may transmit the resource modification information request via a UCI or via a two-part UCI.

At 525, in some cases, base station 105-*b* may determine an uplink grant configuration based on the resource modification information request. For example, base station 105-*b* may determine to implement or to modify one or more parameters indicated by UE 115-*b* via the resource modification information request. Base station 105-*b* may further determine to transmit an indication of an additional grant configuration for uplink transmission occasions (e.g., in addition to the existing grant configuration, such that multiple configured grants may be active for UE 115-*b*), or may determine to transmit an indication of a modified grant configuration for the first set of uplink transmission occasions.

At 530, base station 105-*b* may transmit, to UE 115-*b* and in response to the resource modification information request, a message increasing the first set of uplink transmission occasions to a second density that is greater than the first density. For example, as described herein, the message may indicate one or more parameters associated with the second density and may configure UE 115-*b* with an additional grant configuration or may modify the existing grant configuration for the first set of uplink transmission occasions. In some cases, the message may include an indication of one or more preconfigured parameters or an activated preconfigured uplink grant configuration. In some cases, base station 105-*b* may transmit the message via RRC signaling, MAC signaling, physical layer signaling, or a combination thereof.

At 535, in some cases, UE 115-*b* may transmit one or more uplink transmissions using the second density of the first set of uplink transmission occasions. For example, UE 115-*b* may transmit the one or more uplink transmissions according to the additional configuration or the modified configuration received from base station 105-*b* via the message. For example, UE 115-*b* may transmit the one or more uplink transmissions using a lower periodicity, a higher number of repetition groups, a higher number of RBs, or a higher MCS. UE 115-*b* may also transmit the one or more uplink transmissions using one or more HARQ process ID determination methods as described herein. The second density of the first set of uplink transmission occasions may support transmission of the increased uplink traffic identified by UE 115-*b*.

Figure 6:
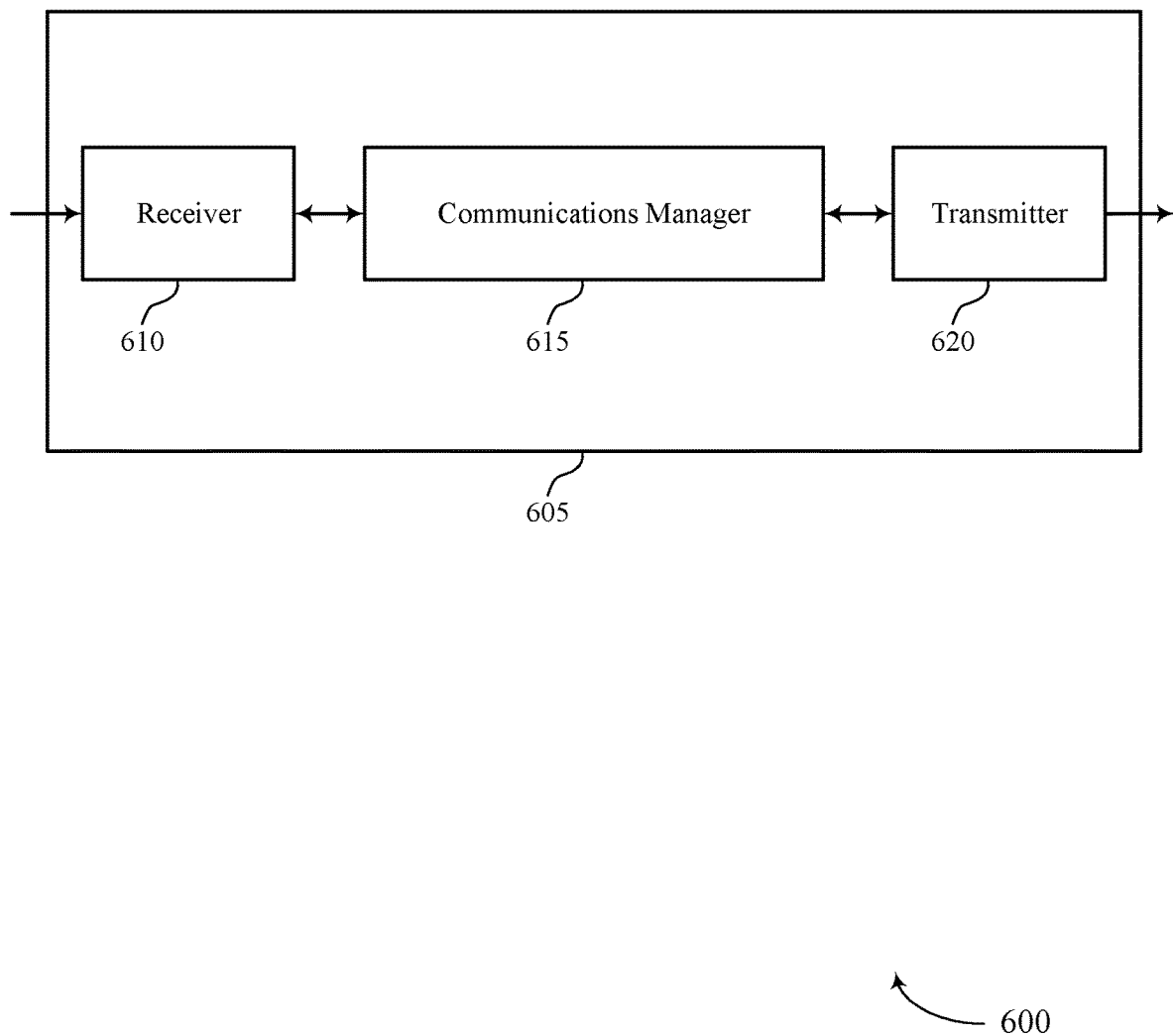
FIGS. 6 and 7 show block diagrams of devices that support modifications to uplink grant configurations in accordance with aspects of the present disclosure.

FIG. 6 shows a block diagram 600 of a device 605 that supports modifications to uplink grant configurations in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to modifications to uplink grant configurations, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate with a base station according to a first uplink grant configuration scheduling a first set of uplink transmission occasions having a first density, determine that the first density of the first set of uplink transmission occasions is to be increased, transmit, to the base station and based on the determination, a resource modification information request indicating a requested increase in the first density of uplink transmission occasions, and receive, in response to the resource modification information request, a message increasing the first set of uplink transmission occasions to a second density that is greater than the first density. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processing (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615, among other examples herein, may be implemented to realize one or more potential advantages. For example, communications manager 615 may increase communication quality and throughput at a wireless device (e.g., a UE 115) by supporting an increase in uplink transmission occasion density for communications between a UE and a base station. The increase in the uplink transmission occasion density may result in increased communication quality or throughput (or any combination thereof) due to an increased likelihood of transmitting uplink data. Accordingly, communications manager 615 may save power and increase battery life at a wireless device (e.g., a UE 115) by strategically increasing a quality of communications at a wireless device (e.g., a UE 115).

Figure 7:
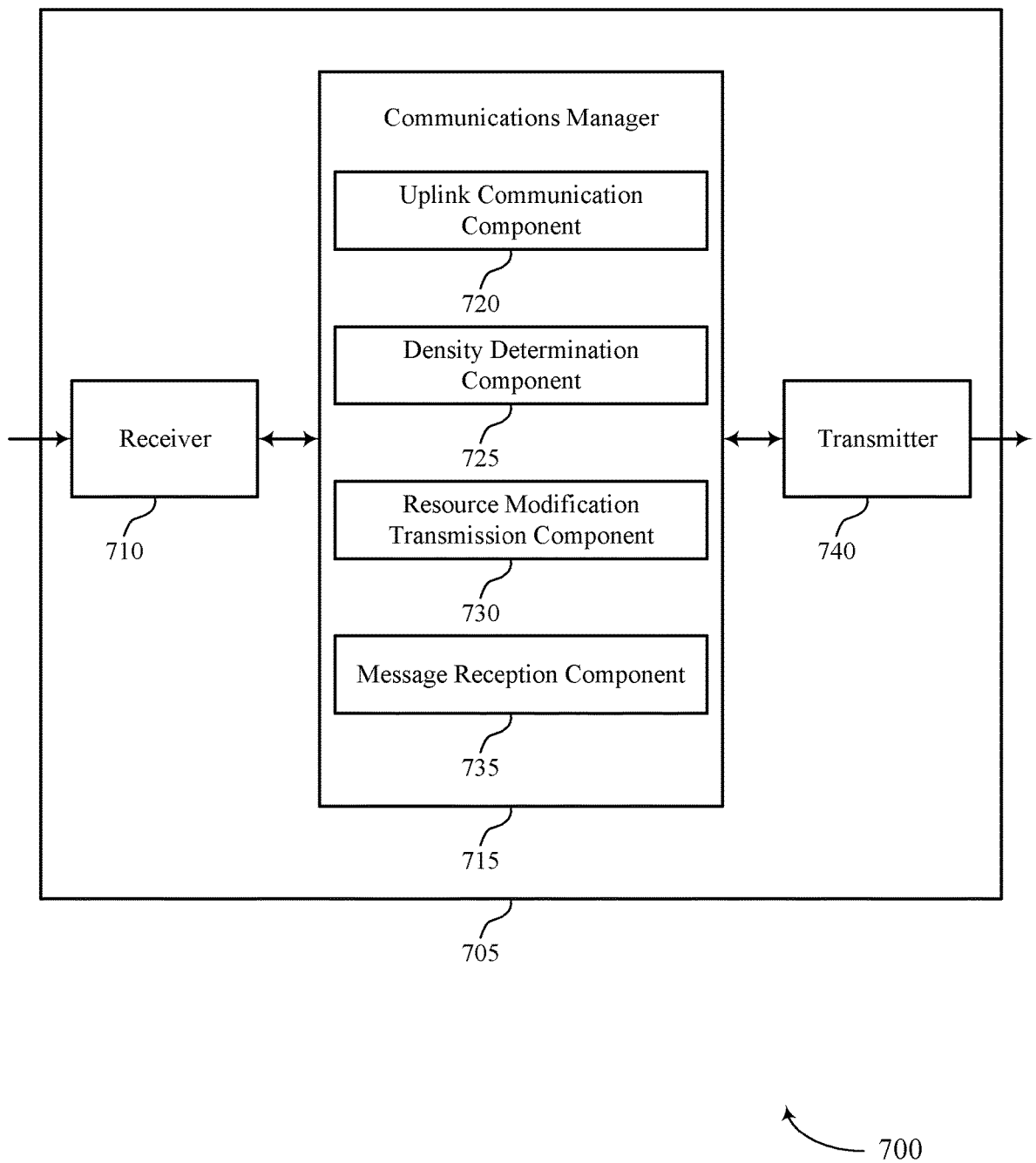

FIG. 7 shows a block diagram 700 of a device 705 that supports modifications to uplink grant configurations in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to modifications to uplink grant configurations, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an uplink communication component 720, a density determination component 725, a resource modification transmission component 730, and a message reception component 735. The communications manager 715 may be an example of aspects of the communications manager 910 described herein.

The uplink communication component 720 may communicate with a base station according to a first uplink grant configuration scheduling a first set of uplink transmission occasions having a first density. The density determination component 725 may determine that the first density of the first set of uplink transmission occasions is to be increased. The resource modification transmission component 730 may transmit, to the base station and based on the determination, a resource modification information request indicating a requested increase in the first density of uplink transmission occasions. The message reception component 735 may receive, in response to the resource modification information request, a message increasing the first set of uplink transmission occasions to a second density that is greater than the first density.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

A processor of a wireless device (e.g., controlling the receiver 710, the transmitter 740, or the transceiver 920 as described with reference to FIG. 9) may increase communication reliability, quality, and throughput. The increased communication quality and throughput may reduce power consumption (e.g., via implementation of system components described with reference to FIG. 8) compared to other systems and techniques, for example, that do not support increase in uplink transmission occasion density for communications between a UE and a base station, which may decrease communication quality and increase power consumption. Further, the processor of the UE 115 may identify one or more aspects of a resource modification request and corresponding message to perform some of the techniques described herein. The processor of the wireless device may use the resource modification request and corresponding message to perform one or more actions that may result in increased communication quality and power consumption, as well as save power and increase battery life at the wireless device (e.g., by strategically supporting increased uplink transmission occasions, which may increase communication quality), among other benefits.

Figure 8:
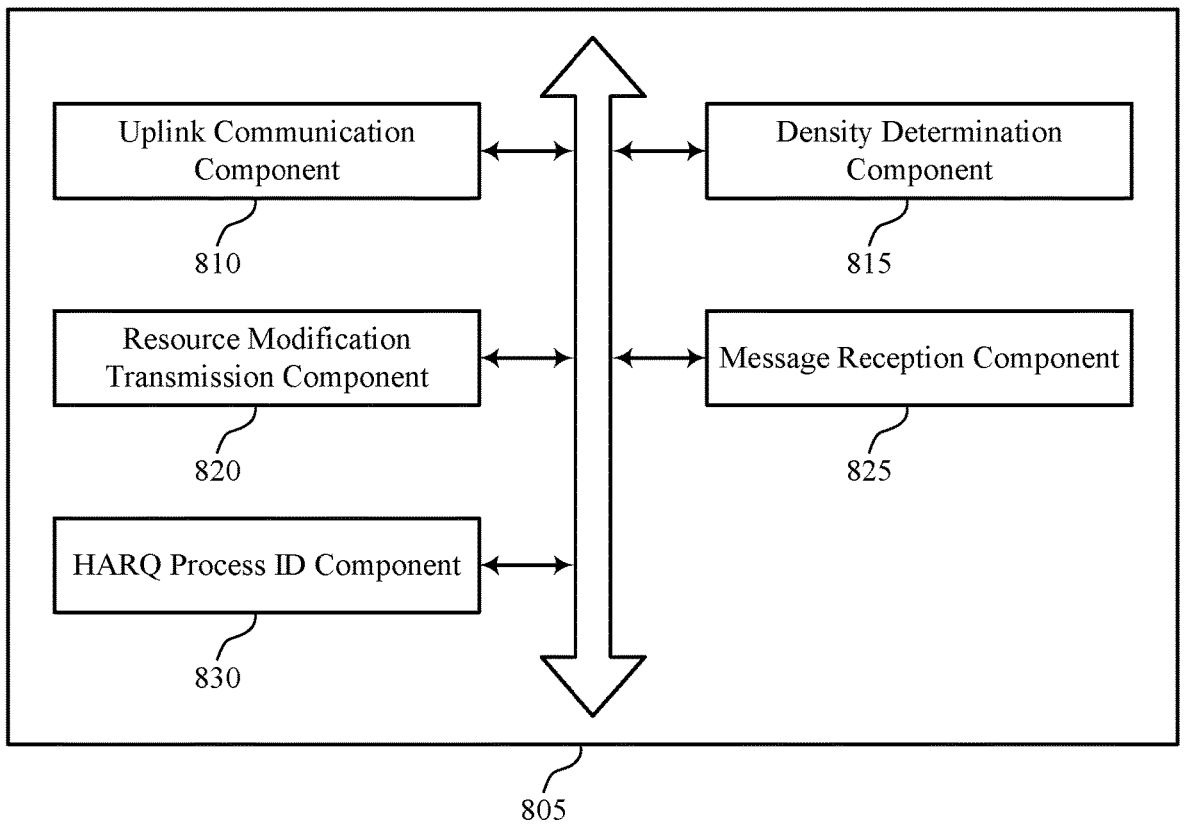
FIG. 8 shows a block diagram of a communications manager that supports modifications to uplink grant configurations in accordance with aspects of the present disclosure.

FIG. 8 shows a block diagram 800 of a communications manager 805 that supports modifications to uplink grant configurations in accordance with aspects of the present disclosure. The communications manager 805 may be an example of aspects of a communications manager 615, a communications manager 715, or a communications manager 910 described herein. The communications manager 805 may include an uplink communication component 810, a density determination component 815, a resource modification transmission component 820, a message reception component 825, and a HARQ process ID component 830. Each of these modules may communicate, directly or indirectly, with one another (e.g., via one or more buses).

The uplink communication component 810 may communicate with a base station according to a first uplink grant configuration scheduling a first set of uplink transmission occasions having a first density. The density determination component 815 may determine that the first density of the first set of uplink transmission occasions is to be increased.

The resource modification transmission component 820 may transmit, to the base station and based on the determination, a resource modification information request indicating a requested increase in the first density of uplink transmission occasions. In some examples, the resource modification transmission component 820 may include an indication of whether to reset a timer associated with one or more of the first set of uplink transmission occasions. In some examples, the resource modification transmission component 820 may include, in the resource modification information request, a request for a decreased periodicity in the first set of uplink transmission occasions, where the request for the increase in the first density of uplink transmission occasions includes the request for the decreased periodicity.

In some examples, the resource modification transmission component 820 may include, in the resource modification information request, a request for an increase in a number of groups of repetitions of the first set of uplink transmission occasions, where the request for the increase in the first density of uplink transmission occasions includes the request for the increase in the number of groups of repetitions. In some examples, different groups of repetitions are associated with different uplink data.

In some examples, the resource modification transmission component 820 may include, in the resource modification information request, a request for an increase in a number of RBs for the first set of uplink transmission occasions or an increase in a MCS of the first set of uplink transmission occasions, where the request for the increase in the first density of uplink transmission occasions includes the request for the increase in the number of RBs or the request for the increase in the MCS.

In some examples, the resource modification transmission component 820 may indicate one or more parameters of the resource modification information request using one or more parameters preconfigured by the base station. In some examples, the resource modification transmission component 820 may include, in the resource modification information request, an indication of a preconfigured grant configuration, where the indication of the preconfigured grant configuration includes the request for the increase in the first density of uplink transmission occasions.

In some examples, the resource modification transmission component 820 may transmit a UCI message including the resource modification information request. In some examples, the resource modification transmission component 820 may transmit a first portion of a UCI message including an indication of the resource modification information request. In some examples, the resource modification transmission component 820 may transmit, based on transmitting the first portion, a second portion of the UCI message including the resource modification information request. In some cases, the resource modification information request is transmitted via MAC signaling.

The message reception component 825 may receive, in response to the resource modification information request, a message increasing the first set of uplink transmission occasions to a second density that is greater than the first density. In some examples, the message reception component 825 may receive, via the message, an indication that the timer associated with one or more of the first set of uplink transmission occasions is reset.

In some examples, the message reception component 825 may receive, via the message, an indication that the second density of the first set of uplink transmission occasions includes an additional subset of uplink transmission occasions. In some examples, the message reception component 825 may receive, via the message and based on the one or more parameters preconfigured by the base station, an indication of the increase of the first set of uplink transmission occasions to the second density. In some examples, the message reception component 825 may receive, via the message and based on preconfigured grant configuration, an indication of the increase of the first set of uplink transmission occasions to the second density. In some cases, the message configures the UE with a same timer for each of the first set of uplink transmission occasions. In some cases, the message is transmitted via MAC signaling or via physical layer signaling.

The HARQ process ID component 830 may include, in the resource modification information request, an indication of a request that a HARQ process ID be based on an equation. In some examples, the HARQ process ID component 830 may identify an offset value for the HARQ process ID based on the HARQ process ID being based on the equation. In some examples, the HARQ process ID component 830 may include an indication of the offset value in the resource modification information request. In some examples, the HARQ process ID component 830 may determine the offset value based on a next available HARQ process ID. In some examples, the HARQ process ID component 830 may determine the offset value based on a total number of configured HARQ processes.

In some examples, the HARQ process ID component 830 may determine the HARQ process ID based on the equation and the second density of the first set of uplink transmission occasions. In some examples, the HARQ process ID component 830 may receive, via the message, an indication of a number of HARQ processes associated with the second density of the first set of uplink transmission occasions. In some examples, the HARQ process ID component 830 may determine the HARQ process ID based on the equation and the number of HARQ processes.

In some examples, the HARQ process ID component 830 may include, in the resource modification information request, an indication of a request that the HARQ process ID be assigned at the UE. In some examples, the HARQ process ID component 830 may receive, via the message and based on the request to assign the HARQ process ID at the UE, an indication that the HARQ process ID is decoupled from a retransmission timer associated with at least one of the first set of uplink transmission occasions. In some examples, the HARQ process ID component 830 may receive, via the message and based on the request to assign the HARQ process ID at the UE, an indication that a timer for one or more of the first set of uplink transmission occasions is set to a value of the retransmission timer.

In some examples, the HARQ process ID component 830 may determine to request to assign respective HARQ process IDs at the UE for one or more first subsets of the first set of uplink transmission occasions. In some examples, the HARQ process ID component 830 may determine to request that respective HARQ process IDs for one or more second subsets of the first set of uplink transmission occasions be based on an equation. In some examples, the HARQ process ID component 830 may include, in the resource modification information request, an indication of one or more first requests to assign respective HARQ process IDs for the one or more first subsets at the UE and an indication of one or more second requests that respective HARQ process IDs for the one or more second subsets be based on the equation.

Figure 9:
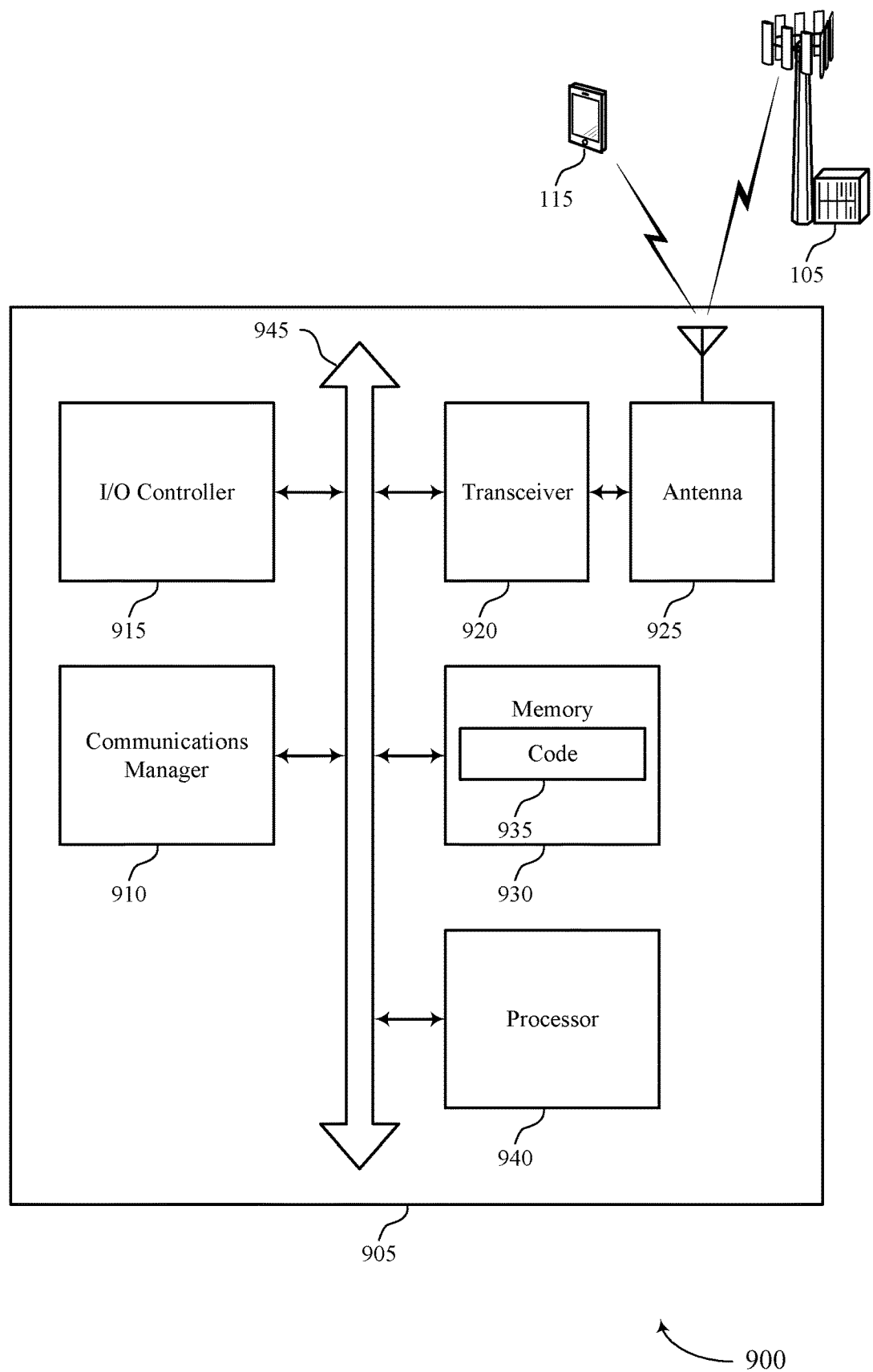
FIG. 9 shows a diagram of a system including a device that supports modifications to uplink grant configurations in accordance with aspects of the present disclosure.

FIG. 9 shows a diagram of a system 900 including a device 905 that supports modifications to uplink grant configurations in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate with a base station according to a first uplink grant configuration scheduling a first set of uplink transmission occasions having a first density, determine that the first density of the first set of uplink transmission occasions is to be increased, transmit, to the base station and based on the determination, a resource modification information request indicating a requested increase in the first density of uplink transmission occasions, and receive, in response to the resource modification information request, a message increasing the first set of uplink transmission occasions to a second density that is greater than the first density.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting modifications to uplink grant configurations).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
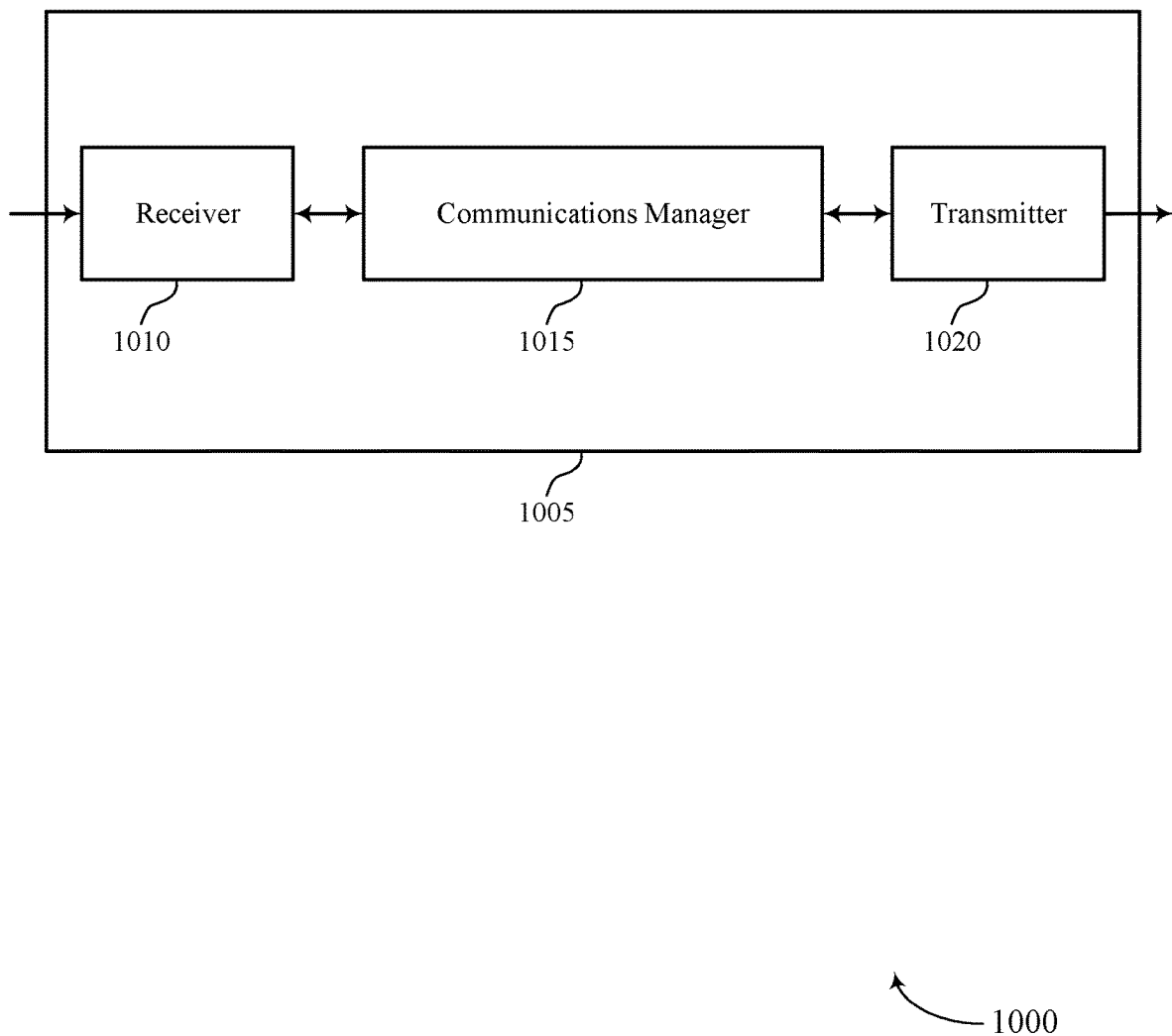
FIGS. 10 and 11 show block diagrams of devices that support modifications to uplink grant configurations in accordance with aspects of the present disclosure.

FIG. 10 shows a block diagram 1000 of a device 1005 that supports modifications to uplink grant configurations in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to modifications to uplink grant configurations, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate with a UE according to a first uplink grant configuration scheduling a first set of uplink transmission occasions for communications between the UE and the base station, the first set of uplink transmission occasions having a first density, receive, from the UE, a resource modification information request indicating a requested increase in the first density of uplink transmission occasions, and transmit, to the UE and in response to the resource modification information request, a message increasing the first set of uplink transmission occasions to a second density that is greater than the first density. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
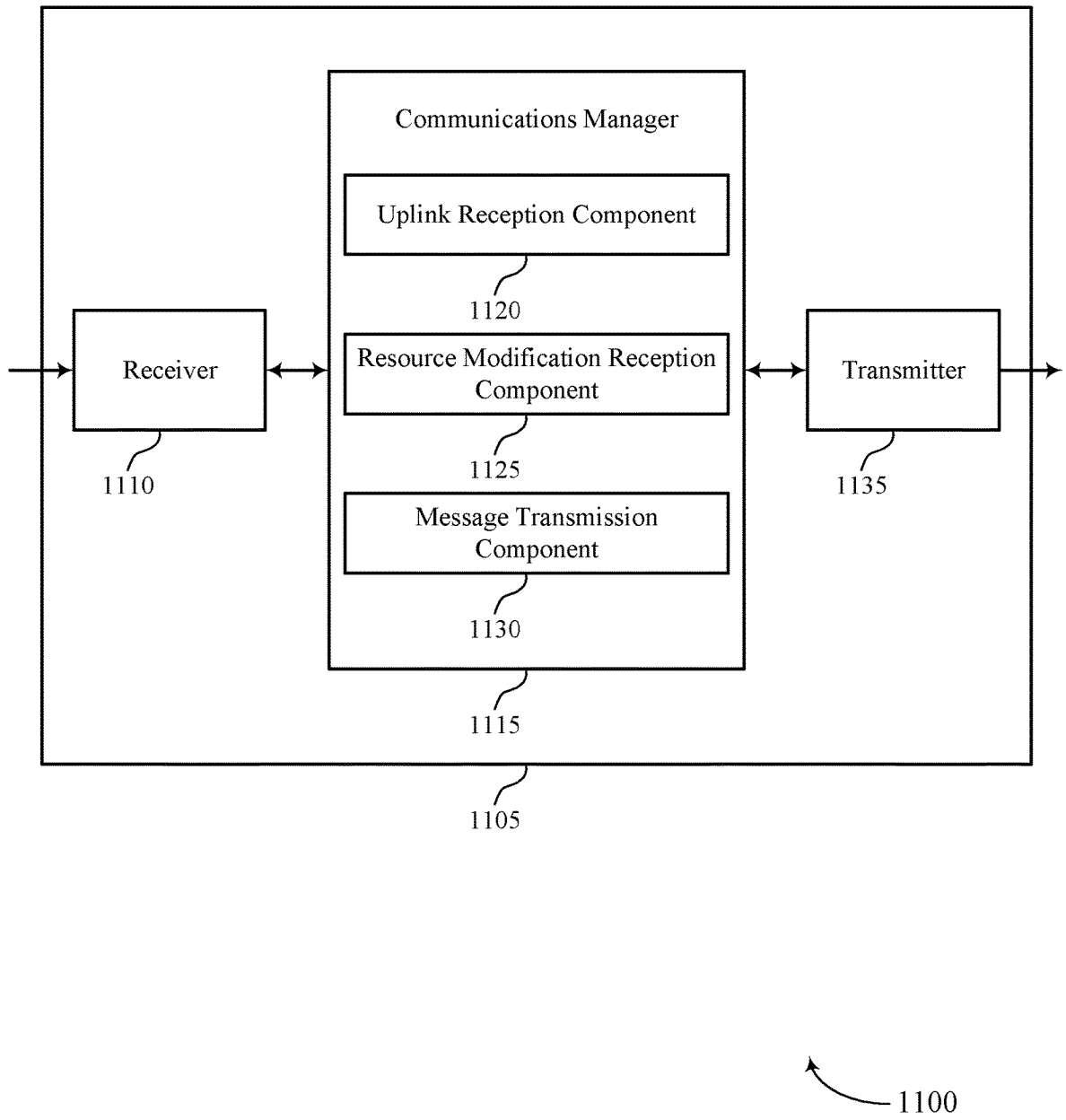

FIG. 11 shows a block diagram 1100 of a device 1105 that supports modifications to uplink grant configurations in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to modifications to uplink grant configurations, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an uplink reception component 1120, a resource modification reception component 1125, and a message transmission component 1130. The communications manager 1115 may be an example of aspects of the communications manager 1310 described herein.

The uplink reception component 1120 may communicate with a UE according to a first uplink grant configuration scheduling a first set of uplink transmission occasions for communications between the UE and the base station, the first set of uplink transmission occasions having a first density. The resource modification reception component 1125 may receive, from the UE, a resource modification information request indicating a requested increase in the first density of uplink transmission occasions. The message transmission component 1130 may transmit, to the UE and in response to the resource modification information request, a message increasing the first set of uplink transmission occasions to a second density that is greater than the first density.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
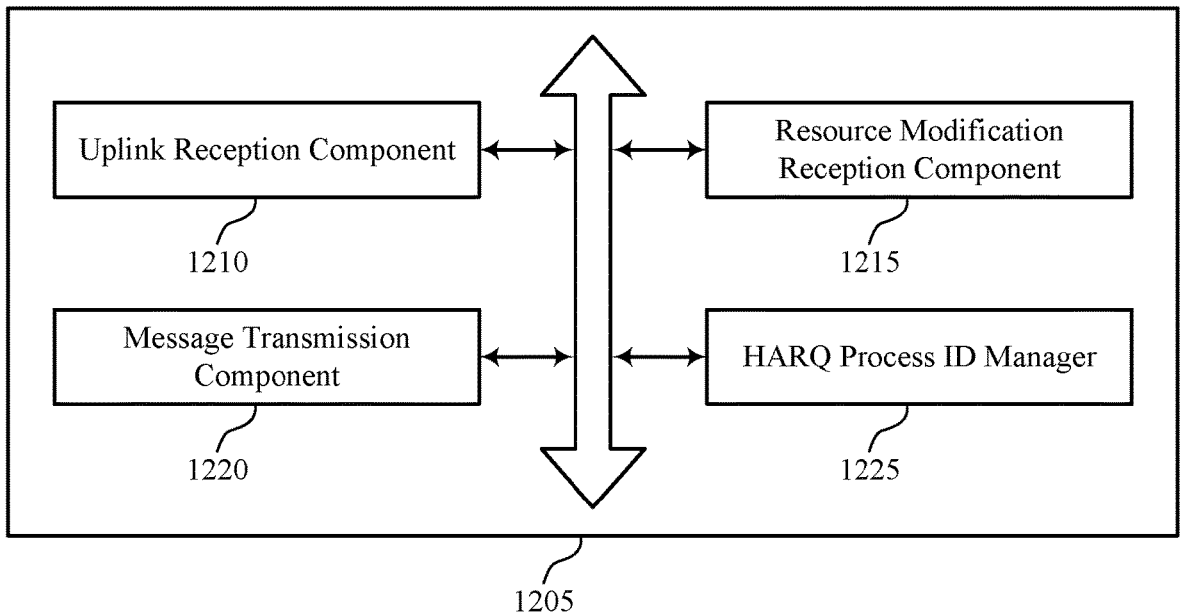
FIG. 12 shows a block diagram of a communications manager that supports modifications to uplink grant configurations in accordance with aspects of the present disclosure.

FIG. 12 shows a block diagram 1200 of a communications manager 1205 that supports modifications to uplink grant configurations in accordance with aspects of the present disclosure. The communications manager 1205 may be an example of aspects of a communications manager 1015, a communications manager 1115, or a communications manager 1310 described herein. The communications manager 1205 may include an uplink reception component 1210, a resource modification reception component 1215, a message transmission component 1220, and a HARQ process ID manager 1225. Each of these modules may communicate, directly or indirectly, with one another (e.g., via one or more buses).

The uplink reception component 1210 may communicate with a UE according to a first uplink grant configuration scheduling a first set of uplink transmission occasions for communications between the UE and the base station, the first set of uplink transmission occasions having a first density.

The resource modification reception component 1215 may receive, from the UE, a resource modification information request indicating a requested increase in the first density of uplink transmission occasions. In some examples, the resource modification reception component 1215 may receive, via the resource modification information request, an indication of whether to reset a timer associated with one or more of the first set of uplink transmission occasions.

In some examples, the resource modification reception component 1215 may receive, via the resource modification information request, a request for a decreased periodicity in the first set of uplink transmission occasions, where the request for the increase in the first density of uplink transmission occasions includes the request for the decreased periodicity. In some examples, the resource modification reception component 1215 may receive, via the resource modification information request, a request for an increase in a number of groups of repetitions of the first set of uplink transmission occasions, where the request for the increase in the first density of uplink transmission occasions includes the request for the increase in the number of groups of repetitions. In some examples, different groups of repetitions are associated with different uplink data.

In some examples, the resource modification reception component 1215 may receive, via the resource modification information request, a request for an increase in a number of RBs for the first set of uplink transmission occasions or an increase in a MCS of the first set of uplink transmission occasions, where the request for the increase in the first density of uplink transmission occasions includes the request for the increase in the number of RBs or the request for the increase in the MCS. In some examples, the resource modification reception component 1215 may receive one or more parameters of the resource modification information request based on one or more parameters preconfigured by the base station. In some examples, the resource modification reception component 1215 may receive, via the resource modification information request, an indication of a preconfigured grant configuration, where the indication of the preconfigured grant configuration includes the request for the increase in the first density of uplink transmission occasions.

In some examples, the resource modification reception component 1215 may receive an UCI message including the resource modification information request. In some examples, the resource modification reception component 1215 may receive a first portion of an UCI message including an indication of the resource modification information request. In some examples, the resource modification reception component 1215 may receive, based on receiving the first portion, a second portion of the UCI message including the resource modification information request. In some cases, the resource modification information request is transmitted via MAC signaling.

The message transmission component 1220 may transmit, to the UE and in response to the resource modification information request, a message increasing the first set of uplink transmission occasions to a second density that is greater than the first density. In some examples, the message transmission component 1220 may transmit, via the message, an indication that the timer associated with one or more of the first set of uplink transmission occasions is reset. In some examples, the message transmission component 1220 may transmit, via the message, an indication that the second density of the first set of uplink transmission occasions includes an additional subset of uplink transmission occasions.

In some examples, the message transmission component 1220 may transmit, via the message and based on the one or more parameters preconfigured by the base station, an indication of the increase of the first set of uplink transmission occasions to the second density. In some examples, the message transmission component 1220 may transmit, via the message and based on the preconfigured grant configuration, an indication of the increase of the first set of uplink transmission occasions to the second density. In some cases, the message configures the UE with a same timer for each of the first set of uplink transmission occasions. In some cases, the message is transmitted via MAC signaling or via physical layer signaling.

The HARQ process ID manager 1225 may receive, via the resource modification information request, an indication of a request that a HARQ process ID be based on an equation. In some examples, the HARQ process ID manager 1225 may configure the message based on the request that the HARQ process ID be based on the equation. In some examples, the HARQ process ID manager 1225 may receive, via the resource modification information request, an offset value for the HARQ process ID based on the request that the HARQ process ID be based on the equation. In some examples, the HARQ process ID manager 1225 may configure the message based on the offset value. In some cases, the offset value is based on a next available HARQ process ID. In some cases, the offset value is based on a total number of configured HARQ processes.

In some examples, the HARQ process ID manager 1225 may transmit, via the message, an indication of a number of HARQ processes associated with the second density of the first set of uplink transmission occasions, where the HARQ process ID is based on the equation and the number of HARQ processes. In some examples, the HARQ process ID manager 1225 may receive, via the resource modification information request, an indication of a request to assign a HARQ process ID at the UE. In some examples, the HARQ process ID manager 1225 may configure the message based on the request to assign the HARQ process ID at the UE.

In some examples, the HARQ process ID manager 1225 may transmit, via the message and based on the request to assign the HARQ process ID at the UE, an indication that the HARQ process ID is decoupled from a retransmission timer associated with at least one of the first set of uplink transmission occasions. In some examples, the HARQ process ID manager 1225 may transmit, via the message and based on the request to assign the HARQ process ID at the UE, an indication that a timer for one or more of the first set of uplink transmission occasions is set to a value of the retransmission timer.

In some examples, the HARQ process ID manager 1225 may receive, via the resource modification information request, an indication of one or more first requests to assign respective HARQ process IDs at the UE for one or more first subsets of the first set of uplink transmission occasions and an indication of one or more second requests that respective HARQ process IDs for one or more second subsets of the first set of uplink transmission occasions be based on an equation. In some examples, the HARQ process ID manager 1225 may configure the message based on the one or more first requests and the one or more second requests. In some cases, the HARQ process ID is based on the equation and the second density of the first set of uplink transmission occasions.

Figure 13:
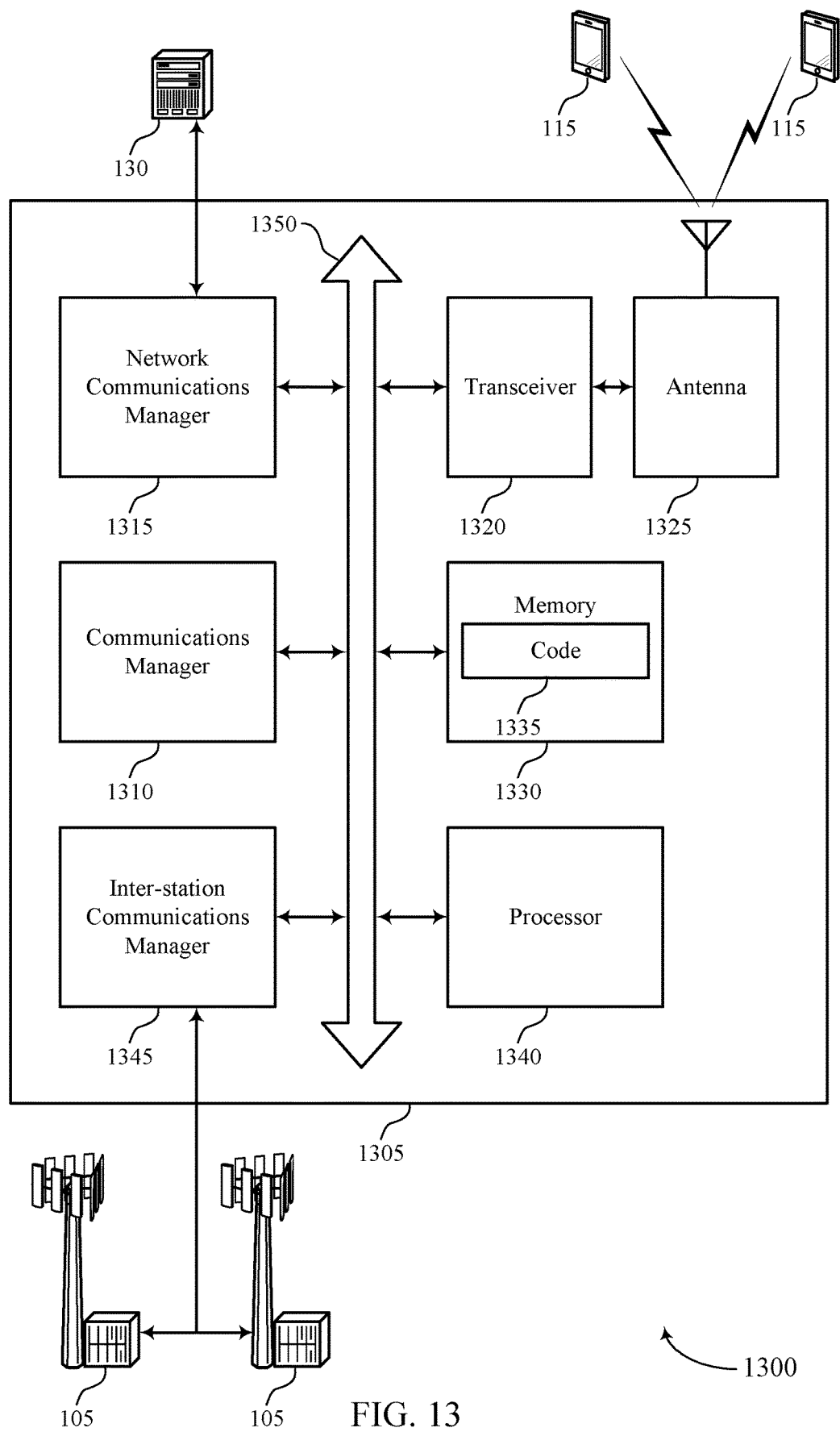
FIG. 13 shows a diagram of a system including a device that supports modifications to uplink grant configurations in accordance with aspects of the present disclosure.

FIG. 13 shows a diagram of a system 1300 including a device 1305 that supports modifications to uplink grant configurations in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may communicate with a UE according to a first uplink grant configuration scheduling a first set of uplink transmission occasions for communications between the UE and the base station, the first set of uplink transmission occasions having a first density, receive, from the UE, a resource modification information request indicating a requested increase in the first density of uplink transmission occasions, and transmit, to the UE and in response to the resource modification information request, a message increasing the first set of uplink transmission occasions to a second density that is greater than the first density.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting modifications to uplink grant configurations).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
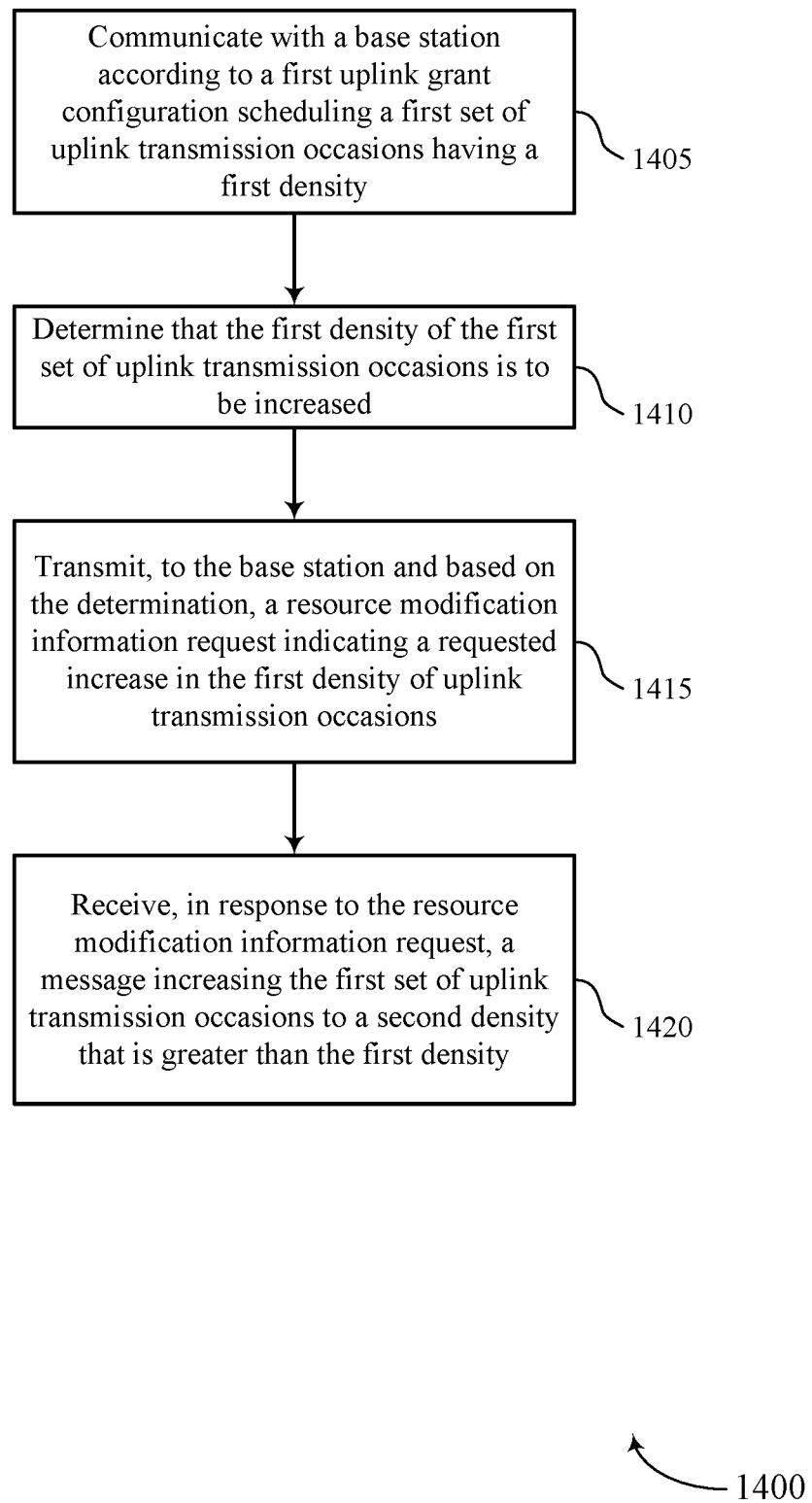
FIGS. 14 through 19 show flowcharts illustrating methods that support modifications to uplink grant configurations in accordance with aspects of the present disclosure.

FIG. 14 shows a flowchart illustrating a method 1400 that supports modifications to uplink grant configurations in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may communicate with a base station according to a first uplink grant configuration scheduling a first set of uplink transmission occasions having a first density. The operations of 1405 may be performed according to the methods described herein. In some examples, aspects of the operations of 1405 may be performed by an uplink communication component as described with reference to FIGS. 6 through 9.

At 1410, the UE may determine that the first density of the first set of uplink transmission occasions is to be increased. The operations of 1410 may be performed according to the methods described herein. In some examples, aspects of the operations of 1410 may be performed by a density determination component as described with reference to FIGS. 6 through 9.

At 1415, the UE may transmit, to the base station and based on the determination, a resource modification information request indicating a requested increase in the first density of uplink transmission occasions. The operations of 1415 may be performed according to the methods described herein. In some examples, aspects of the operations of 1415 may be performed by a resource modification transmission component as described with reference to FIGS. 6 through 9.

At 1420, the UE may receive, in response to the resource modification information request, a message increasing the first set of uplink transmission occasions to a second density that is greater than the first density. The operations of 1420 may be performed according to the methods described herein. In some examples, aspects of the operations of 1420 may be performed by a message reception component as described with reference to FIGS. 6 through 9.

Figure 15:
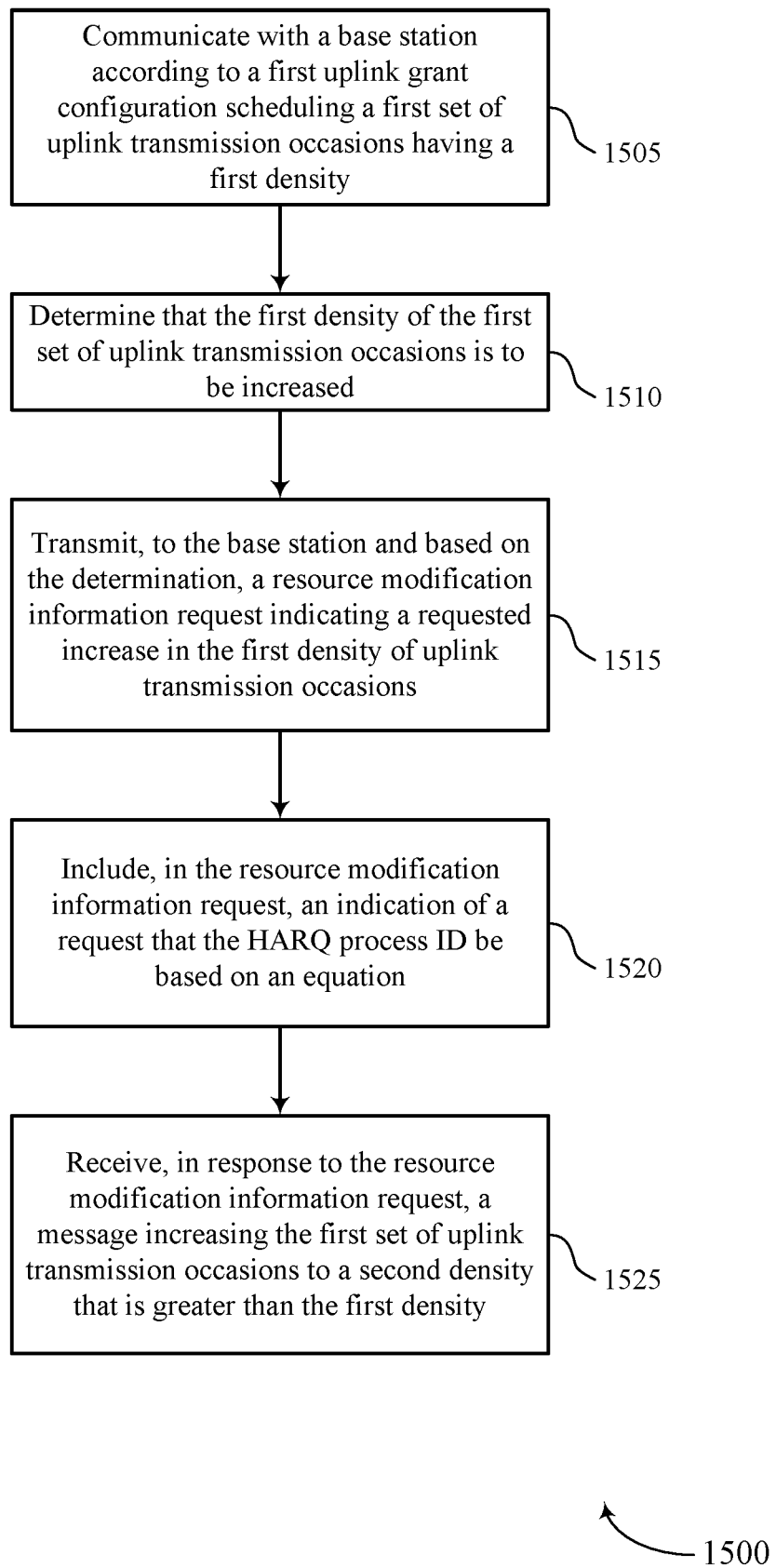

FIG. 15 shows a flowchart illustrating a method 1500 that supports modifications to uplink grant configurations in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may communicate with a base station according to a first uplink grant configuration scheduling a first set of uplink transmission occasions having a first density. The operations of 1505 may be performed according to the methods described herein. In some examples, aspects of the operations of 1505 may be performed by an uplink communication component as described with reference to FIGS. 6 through 9.

At 1510, the UE may determine that the first density of the first set of uplink transmission occasions is to be increased. The operations of 1510 may be performed according to the methods described herein. In some examples, aspects of the operations of 1510 may be performed by a density determination component as described with reference to FIGS. 6 through 9.

At 1515, the UE may transmit, to the base station and based on the determination, a resource modification information request indicating a requested increase in the first density of uplink transmission occasions. The operations of 1515 may be performed according to the methods described herein. In some examples, aspects of the operations of 1515 may be performed by a resource modification transmission component as described with reference to FIGS. 6 through 9.

At 1520, the UE may include, in the resource modification information request, an indication of a request that the HARQ process ID be based on an equation. The operations of 1520 may be performed according to the methods described herein. In some examples, aspects of the operations of 1520 may be performed by a HARQ process ID component as described with reference to FIGS. 6 through 9.

At 1525, the UE may receive, in response to the resource modification information request, a message increasing the first set of uplink transmission occasions to a second density that is greater than the first density. The operations of 1525 may be performed according to the methods described herein. In some examples, aspects of the operations of 1525 may be performed by a message reception component as described with reference to FIGS. 6 through 9.

Figure 16:
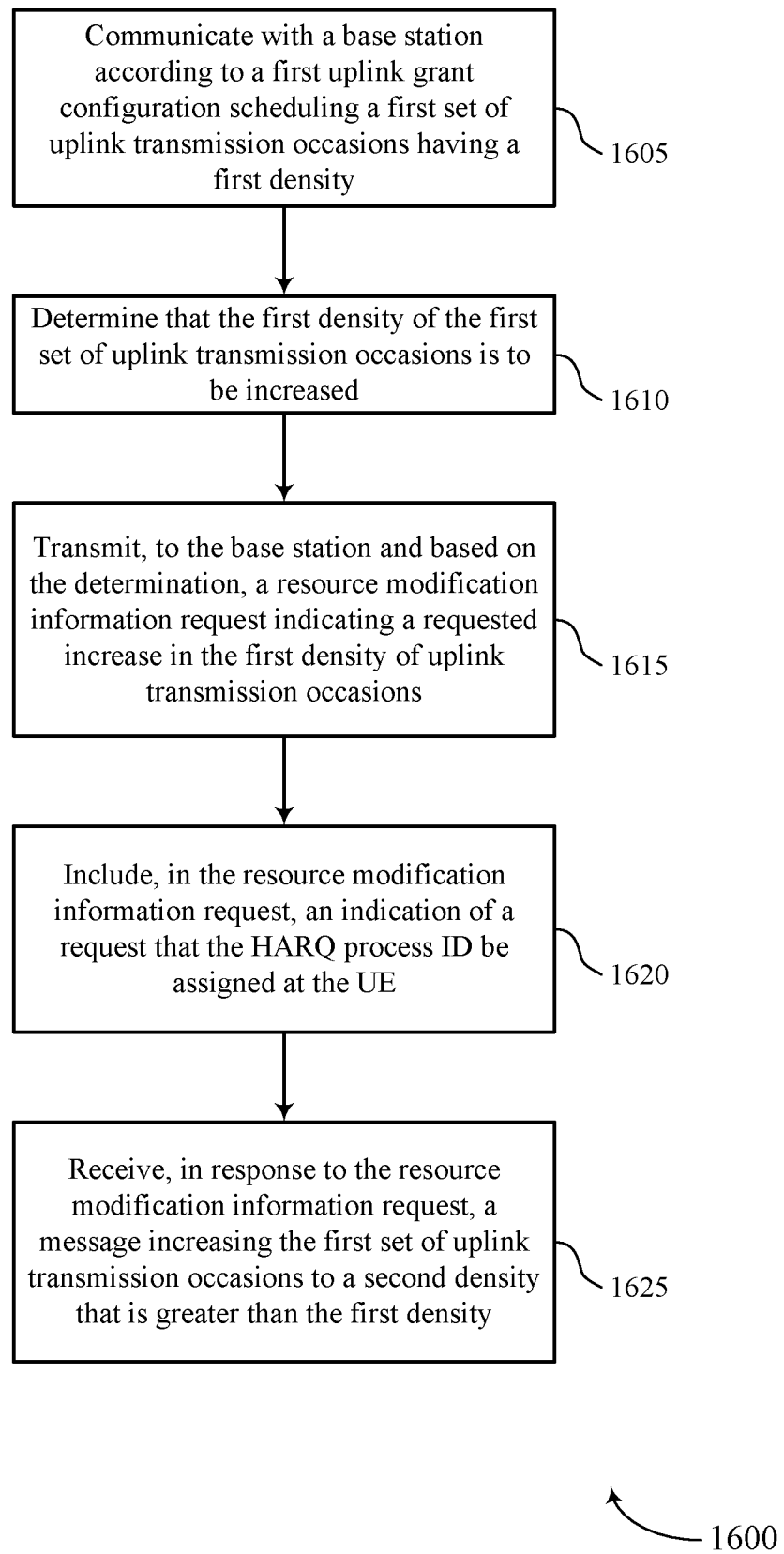

FIG. 16 shows a flowchart illustrating a method 1600 that supports modifications to uplink grant configurations in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may communicate with a base station according to a first uplink grant configuration scheduling a first set of uplink transmission occasions having a first density. The operations of 1605 may be performed according to the methods described herein. In some examples, aspects of the operations of 1605 may be performed by an uplink communication component as described with reference to FIGS. 6 through 9.

At 1610, the UE may determine that the first density of the first set of uplink transmission occasions is to be increased. The operations of 1610 may be performed according to the methods described herein. In some examples, aspects of the operations of 1610 may be performed by a density determination component as described with reference to FIGS. 6 through 9.

At 1615, the UE may transmit, to the base station and based on the determination, a resource modification information request indicating a requested increase in the first density of uplink transmission occasions. The operations of 1615 may be performed according to the methods described herein. In some examples, aspects of the operations of 1615 may be performed by a resource modification transmission component as described with reference to FIGS. 6 through 9.

At 1620, the UE may include, in the resource modification information request, an indication of a request that the HARQ process ID be assigned at the UE. The operations of 1620 may be performed according to the methods described herein. In some examples, aspects of the operations of 1620 may be performed by a HARQ process ID component as described with reference to FIGS. 6 through 9.

At 1625, the UE may receive, in response to the resource modification information request, a message increasing the first set of uplink transmission occasions to a second density that is greater than the first density. The operations of 1625 may be performed according to the methods described herein. In some examples, aspects of the operations of 1625 may be performed by a message reception component as described with reference to FIGS. 6 through 9.

Figure 17:
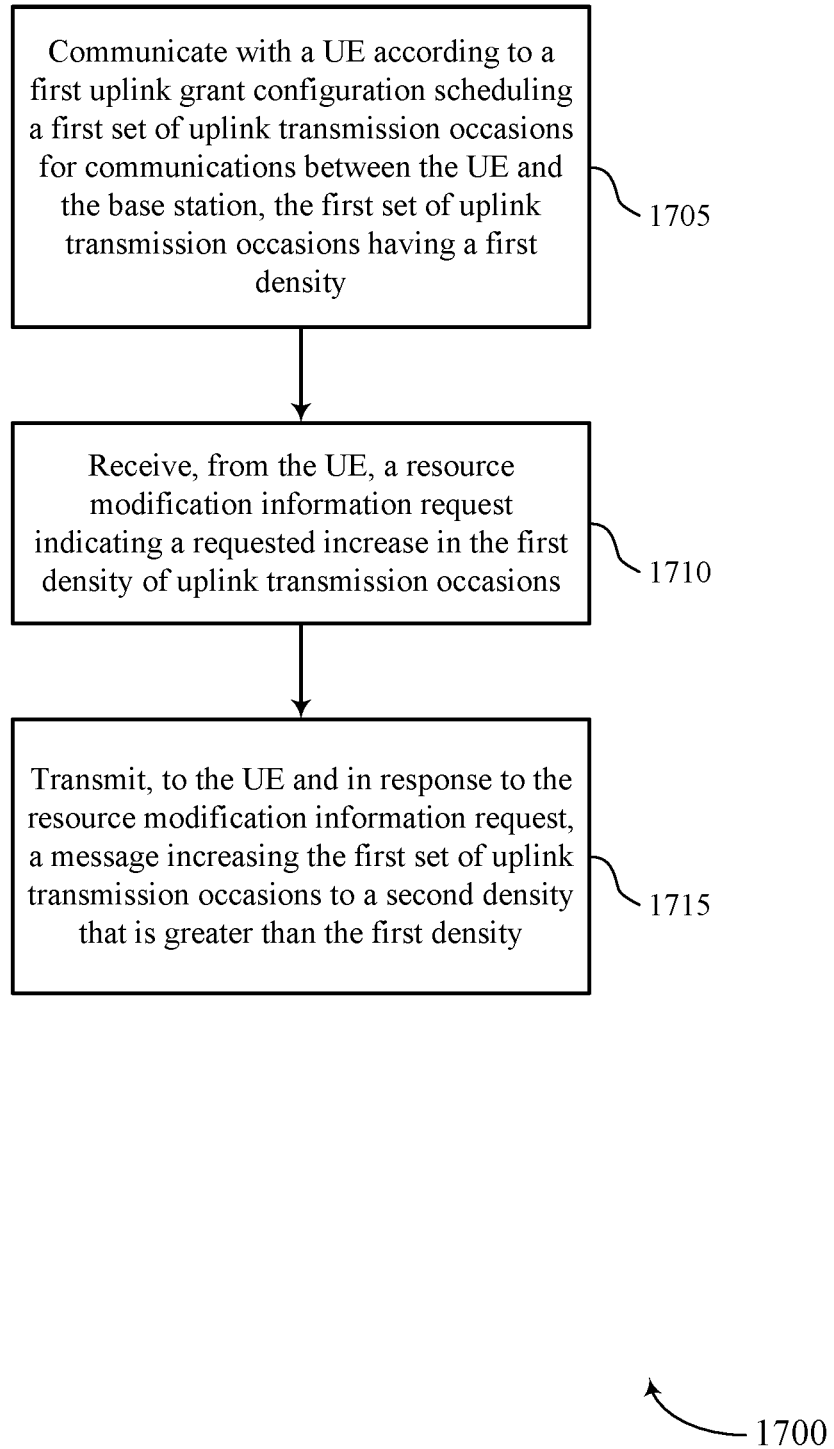

FIG. 17 shows a flowchart illustrating a method 1700 that supports modifications to uplink grant configurations in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may communicate with a UE according to a first uplink grant configuration scheduling a first set of uplink transmission occasions for communications between the UE and the base station, the first set of uplink transmission occasions having a first density. The operations of 1705 may be performed according to the methods described herein. In some examples, aspects of the operations of 1705 may be performed by an uplink reception component as described with reference to FIGS. 10 through 13.

At 1710, the base station may receive, from the UE, a resource modification information request indicating a requested increase in the first density of uplink transmission occasions. The operations of 1710 may be performed according to the methods described herein. In some examples, aspects of the operations of 1710 may be performed by a resource modification reception component as described with reference to FIGS. 10 through 13.

At 1715, the base station may transmit, to the UE and in response to the resource modification information request, a message increasing the first set of uplink transmission occasions to a second density that is greater than the first density. The operations of 1715 may be performed according to the methods described herein. In some examples, aspects of the operations of 1715 may be performed by a message transmission component as described with reference to FIGS. 10 through 13.

Figure 18:
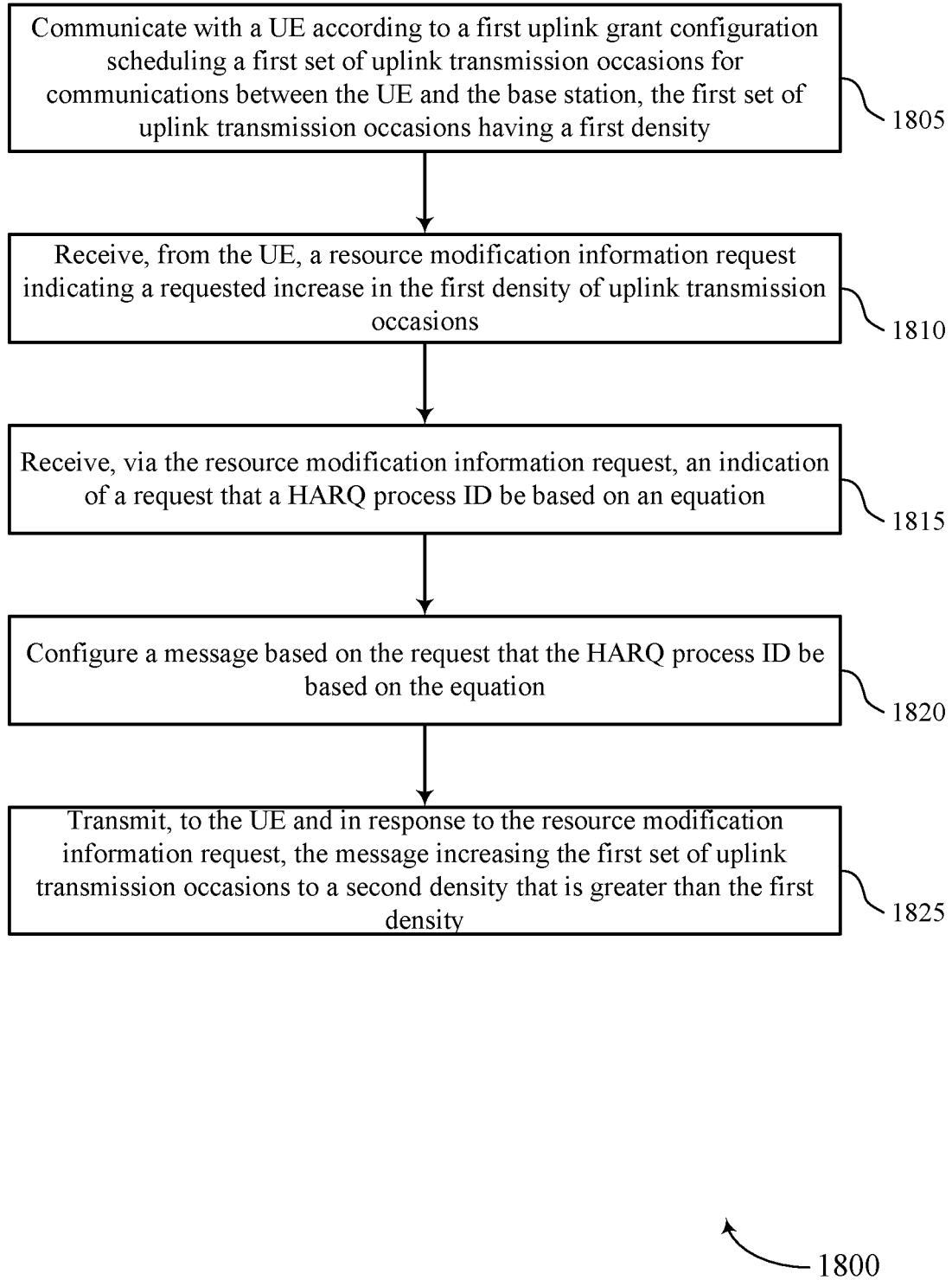

FIG. 18 shows a flowchart illustrating a method 1800 that supports modifications to uplink grant configurations in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may communicate with a UE according to a first uplink grant configuration scheduling a first set of uplink transmission occasions for communications between the UE and the base station, the first set of uplink transmission occasions having a first density. The operations of 1805 may be performed according to the methods described herein. In some examples, aspects of the operations of 1805 may be performed by an uplink reception component as described with reference to FIGS. 10 through 13.

At 1810, the base station may receive, from the UE, a resource modification information request indicating a requested increase in the first density of uplink transmission occasions. The operations of 1810 may be performed according to the methods described herein. In some examples, aspects of the operations of 1810 may be performed by a resource modification reception component as described with reference to FIGS. 10 through 13.

At 1815, the base station may receive, via the resource modification information request, an indication of a request that a HARQ process ID be based on an equation. The operations of 1815 may be performed according to the methods described herein. In some examples, aspects of the operations of 1815 may be performed by a HARQ process ID manager as described with reference to FIGS. 10 through 13.

At 1820, the base station may configure the message based on the request that the HARQ process ID be based on the equation. The operations of 1820 may be performed according to the methods described herein. In some examples, aspects of the operations of 1820 may be performed by a HARQ process ID manager as described with reference to FIGS. 10 through 13.

At 1825, the base station may transmit, to the UE and in response to the resource modification information request, a message increasing the first set of uplink transmission occasions to a second density that is greater than the first density. The operations of 1825 may be performed according to the methods described herein. In some examples, aspects of the operations of 1825 may be performed by a message transmission component as described with reference to FIGS. 10 through 13.

Figure 19:
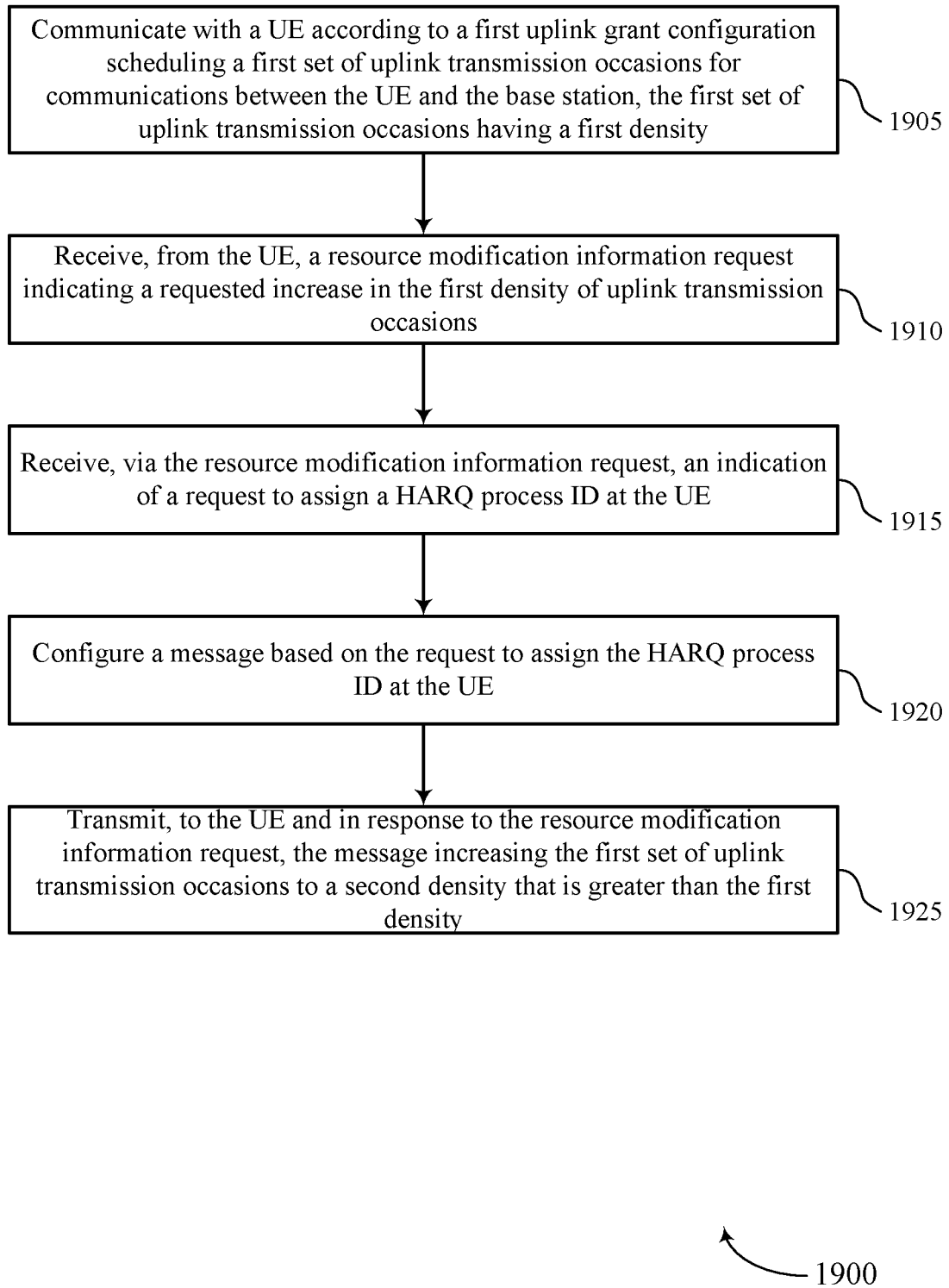

FIG. 19 shows a flowchart illustrating a method 1900 that supports modifications to uplink grant configurations in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may communicate with a UE according to a first uplink grant configuration scheduling a first set of uplink transmission occasions for communications between the UE and the base station, the first set of uplink transmission occasions having a first density. The operations of 1905 may be performed according to the methods described herein. In some examples, aspects of the operations of 1905 may be performed by an uplink reception component as described with reference to FIGS. 10 through 13.

At 1910, the base station may receive, from the UE, a resource modification information request indicating a requested increase in the first density of uplink transmission occasions. The operations of 1910 may be performed according to the methods described herein. In some examples, aspects of the operations of 1910 may be performed by a resource modification reception component as described with reference to FIGS. 10 through 13.

At 1915, the base station may receive, via the resource modification information request, an indication of a request to assign a HARQ process ID at the UE. The operations of 1915 may be performed according to the methods described herein. In some examples, aspects of the operations of 1915 may be performed by a HARQ process ID manager as described with reference to FIGS. 10 through 13.

At 1920, the base station may configure the message based on the request to assign the HARQ process ID at the UE. The operations of 1920 may be performed according to the methods described herein. In some examples, aspects of the operations of 1920 may be performed by a HARQ process ID manager as described with reference to FIGS. 10 through 13.

At 1925, the base station may transmit, to the UE and in response to the resource modification information request, a message increasing the first set of uplink transmission occasions to a second density that is greater than the first density. The operations of 1925 may be performed according to the methods described herein. In some examples, aspects of the operations of 1925 may be performed by a message transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Aspect 1: A method for wireless communication at a UE, comprising communicating with a base station according to a first uplink grant configuration scheduling a first set of uplink transmission occasions having a first density; determining that the first density of the first set of uplink transmission occasions is to be increased; transmitting, to the base station and based at least in part on the determination, a resource modification information request indicating a requested increase in the first density of uplink transmission occasions; and receiving, in response to the resource modification information request, a message increasing the first set of uplink transmission occasions to a second density that is greater than the first density.

Aspect 2: The method of aspect 1, wherein transmitting the resource modification information request comprises: including, in the resource modification information request, an indication of a request that a HARQ process ID be based at least in part on an equation.

Aspect 3: The method of aspect 2, further comprising: identifying an offset value for the HARQ process ID based at least in part on the HARQ process ID being based at least in part on the equation including an indication of the offset value in the resource modification information request.

Aspect 4: The method of aspect 3, wherein identifying the offset value for the HARQ process ID comprises: determining the offset value based at least in part on a next available HARQ process ID.

Aspect 5: The method of aspect 3, wherein identifying the offset value for the HARQ process ID comprises: determining the offset value based at least in part on a total number of configured HARQ processes.

Aspect 6: The method of any one of aspects 2 through 5, further comprising: determining the HARQ process ID based at least in part on the equation and the second density of the first set of uplink transmission occasions.

Aspect 7: The method of any one of aspects 2 through 6, further comprising: receiving, via the message, an indication of a number of HARQ processes associated with the second density of the first set of uplink transmission occasions; and determining the HARQ process ID based at least in part on the equation and the number of HARQ processes.

Aspect 8: The method of aspect 1, wherein transmitting the resource modification information request comprises: including, in the resource modification information request, an indication of a request that a HARQ process ID be assigned at the UE.

Aspect 9: The method of aspect 8, further comprising: receiving, via the message and based at least in part on the request to assign the HARQ process ID at the UE, an indication that the HARQ process ID is decoupled from a retransmission timer associated with at least one of the first set of uplink transmission occasions; receiving, via the message and based at least in part on the request to assign the HARQ process ID at the UE, an indication that a timer for one or more of the first set of uplink transmission occasions is set to a value of the retransmission timer.

Aspect 10: The method of any one of aspects 1 through 9, further comprising: determining to request to assign respective HARQ process IDs at the UE for one or more first subsets of the first set of uplink transmission occasions; determining to request that respective HARQ process IDs for one or more second subsets of the first set of uplink transmission occasions be based at least in part on an equation; and including, in the resource modification information request, an indication of one or more first requests to assign respective HARQ process IDs for the one or more first subsets at the UE and an indication of one or more second requests that respective HARQ process IDs for the one or more second subsets be based at least in part on the equation.

Aspect 11: The method of any one of aspects 1 through 10, wherein transmitting the resource modification information request comprises: including an indication of whether to reset a timer associated with one or more of the first set of uplink transmission occasions.

Aspect 12: The method of aspect 11, further comprising: receiving, via the message, an indication that the timer associated with one or more of the first set of uplink transmission occasions is reset.

Aspect 13: The method of any one of aspects 1 through 12, further comprising: receiving, via the message, an indication that the second density of the first set of uplink transmission occasions comprises an additional subset of uplink transmission occasions.

Aspect 14: The method of aspect 13, wherein the message configures the UE with a same timer for each of the first set of uplink transmission occasions.

Aspect 15: The method of any one of aspects 1 through 14, wherein transmitting the resource modification information request comprises: including, in the resource modification information request, a request for a decreased periodicity in the first set of uplink transmission occasions, wherein the request for the increase in the first density of uplink transmission occasions comprises the request for the decreased periodicity.

Aspect 16: The method of any one of aspects 1 through 14, wherein transmitting the resource modification information request comprises: including, in the resource modification information request, a request for an increase in a number of groups of repetitions of the first set of uplink transmission occasions, wherein the request for the increase in the first density of uplink transmission occasions comprises the request for the increase in the number of groups of repetitions.

Aspect 17: The method of aspect 16, wherein different groups of repetitions are associated with different uplink data.

Aspect 18: The method of any one of aspects 1 through 14, wherein transmitting the resource modification information request comprises: including, in the resource modification information request, a request for an increase in a number of RBs for the first set of uplink transmission occasions or an increase in a MCS of the first set of uplink transmission occasions, wherein the request for the increase in the first density of uplink transmission occasions comprises the request for the increase in the number of RBs or the request for the increase in the MCS.

Aspect 19: The method of any one of aspects 1 through 18, further comprising: indicating one or more parameters of the resource modification information request using one or more parameters preconfigured by the base station; and receiving, via the message and based at least in part on the one or more parameters preconfigured by the base station, an indication of the increase of the first set of uplink transmission occasions to the second density.

Aspect 20: The method of any one of aspects 1 through 18, further comprising: including, in the resource modification information request, an indication of a preconfigured grant configuration, wherein the indication of the preconfigured grant configuration comprises the request for the increase in the first density of uplink transmission occasions; and receiving, via the message and based at least in part on the preconfigured grant configuration, an indication of the increase of the first set of uplink transmission occasions to the second density.

Aspect 21: The method of any one of aspects 1 through 20, wherein transmitting the resource modification information request comprises: transmitting an uplink control information message comprising the resource modification information request.

Aspect 22: The method of any one of aspects 1 through 21, wherein transmitting the resource modification information request comprises: transmitting a first portion of an uplink control information message comprising an indication of the resource modification information request; transmitting, based at least in part on transmitting the first portion, a second portion of the uplink control information message comprising the resource modification information request.

Aspect 23: The method of any one of aspects 1 through 20, wherein the resource modification information request is transmitted via MAC signaling.

Aspect 24: The method of any one of aspects 1 through 23, wherein the message is transmitted via MAC signaling or via physical layer signaling.

Aspect 25: A method for wireless communication at a base station, comprising: communicating with a UE according to a first uplink grant configuration scheduling a first set of uplink transmission occasions for communications between the UE and the base station, the first set of uplink transmission occasions having a first density; receiving, from the UE, a resource modification information request indicating a requested increase in the first density of uplink transmission occasions; and transmitting, to the UE and in response to the resource modification information request, a message increasing the first set of uplink transmission occasions to a second density that is greater than the first density.

Aspect 26: The method of aspect 25, wherein receiving the resource modification information request comprises: receiving, via the resource modification information request, an indication of a request that a HARQ process ID be based at least in part on an equation; and configuring the message based at least in part on the request that the HARQ process ID be based at least in part on the equation.

Aspect 27: The method of aspect 26, further comprising: receiving, via the resource modification information request, an offset value for the HARQ process ID based at least in part on the request that the HARQ process ID be based at least in part on the equation; and configuring the message based at least in part on the offset value.

Aspect 28: The method of aspect 27, wherein the offset value is based at least in part on a next available HARQ process ID.

Aspect 29: The method of aspect 27, wherein the offset value is based at least in part on a total number of configured HARQ processes.

Aspect 30: The method of any one of aspects 26 through 29, wherein the HARQ process ID is based at least in part on the equation and the second density of the first set of uplink transmission occasions.

Aspect 31: The method of any one of aspects 26 through 30, further comprising: transmitting, via the message, an indication of a number of HARQ processes associated with the second density of the first set of uplink transmission occasions, wherein the HARQ process ID is based at least in part on the equation and the number of HARQ processes.

Aspect 32: The method of aspect 25, wherein receiving the resource modification information request comprises: receiving, via the resource modification information request, an indication of a request to assign a HARQ process ID at the UE; and configuring the message based at least in part on the request to assign the HARQ process ID at the UE.

Aspect 33: The method of aspect 32, further comprising: transmitting, via the message and based at least in part on the request to assign the HARQ process ID at the UE, an indication that the HARQ process ID is decoupled from a retransmission timer associated with at least one of the first set of uplink transmission occasions; and transmitting, via the message and based at least in part on the request to assign the HARQ process ID at the UE, an indication that a timer for one or more of the first set of uplink transmission occasions is set to a value of the retransmission timer.

Aspect 34: The method of any one of aspects 25 through 33, further comprising: receiving, via the resource modification information request, an indication of one or more first requests to assign respective HARQ process IDs at the UE for one or more first subsets of the first set of uplink transmission occasions and an indication of one or more second requests that respective HARQ process IDs for one or more second subsets of the first set of uplink transmission occasions be based at least in part on an equation; and configuring the message based at least in part on the one or more first requests and the one or more second requests.

Aspect 35: The method of any one of aspects 25 through 34, wherein receiving the resource modification information request comprises: receiving, via the resource modification information request, an indication of whether to reset a timer associated with one or more of the first set of uplink transmission occasions.

Aspect 36: The method of aspect 35, further comprising: transmitting, via the message, an indication that the timer associated with one or more of the first set of uplink transmission occasions is reset.

Aspect 37: The method of any one of aspects 25 through 36, further comprising: transmitting, via the message, an indication that the second density of the first set of uplink transmission occasions comprises an additional subset of uplink transmission occasions.

Aspect 38: The method of aspect 37, wherein the message configures the UE with a same timer for each of the first set of uplink transmission occasions.

Aspect 39: The method of any one of aspects 25 through 38, wherein receiving the resource modification information request comprises: receiving, via the resource modification information request, a request for a decreased periodicity in the first set of uplink transmission occasions, wherein the request for the increase in the first density of uplink transmission occasions comprises the request for the decreased periodicity.

Aspect 40: The method of any one of aspects 25 through 38, wherein receiving the resource modification information request comprises: receiving, via the resource modification information request, a request for an increase in a number of groups of repetitions of the first set of uplink transmission occasions, wherein the request for the increase in the first density of uplink transmission occasions comprises the request for the increase in the number of groups of repetitions.

Aspect 41: The method of aspect 40, wherein: different groups of repetitions are associated with different uplink data.

Aspect 42: The method of any one of aspects 25 through 38, wherein receiving the resource modification information request comprises: receiving, via the resource modification information request, a request for an increase in a number of RBs for the first set of uplink transmission occasions or an increase in a MCS of the first set of uplink transmission occasions, wherein the request for the increase in the first density of uplink transmission occasions comprises the request for the increase in the number of RBs or the request for the increase in the MCS.

Aspect 43: The method of any one of aspects 25 through 42, further comprising: receiving one or more parameters of the resource modification information request based at least in part on one or more parameters preconfigured by the base station; and transmitting, via the message and based at least in part on the one or more parameters preconfigured by the base station, an indication of the increase of the first set of uplink transmission occasions to the second density.

Aspect 44: The method of any one of aspects 25 through 42, further comprising: receiving, via the resource modification information request, an indication of a preconfigured grant configuration, wherein the preconfigured grant configuration comprises the request for the increase in the first density of uplink transmission occasions; and transmitting, via the message and based at least in part on the preconfigured grant configuration, an indication of the increase of the first set of uplink transmission occasions to the second density.

Aspect 45: The method of any one of aspects 25 through 43, wherein receiving the resource modification information request comprises: receiving an uplink control information message comprising the resource modification information request.

Aspect 46: The method of any one of aspects 25 through 44, wherein receiving the resource modification information request comprises: receiving a first portion of an uplink control information message comprising an indication of the resource modification information request; and receiving, based at least in part on receiving the first portion, a second portion of the uplink control information message comprising the resource modification information request.

Aspect 47: The method of any one of aspects 25 through 43, wherein the resource modification information request is transmitted via MAC signaling.

Aspect 48: The method of any one of aspects 25 through 46, wherein the message is transmitted via MAC signaling or via physical layer signaling.

Aspect 49: An apparatus for wireless communication at a UE comprising at least one means for performing a method of any one of aspects 1 through 24.

Aspect 50: An apparatus for wireless communication at a UE comprising a processor, memory coupled with the processor, and instructions stored in the memory and executable by the processor to cause the apparatus to perform a method of any one of aspects 1 through 24.

Aspect 51: A non-transitory computer-readable medium storing code for wireless communication at a UE comprising a processor, memory coupled with the processor, and instructions stored in the memory and executable by the processor to cause the apparatus to perform a method of any one of aspects 1 through 24.

Aspect 52: An apparatus for wireless communication at a base station comprising at least one means for performing a method of any one of aspects 25 through 48.

Aspect 53: An apparatus for wireless communication at a base station comprising a processor, memory coupled with the processor, and instructions stored in the memory and executable by the processor to cause the apparatus to perform a method of any one of aspects 25 through 48.

Aspect 54: A non-transitory computer-readable medium storing code for wireless communication at a base station comprising a processor, memory coupled with the processor, and instructions stored in the memory and executable by the processor to cause the apparatus to perform a method of any one of aspects 25 through 48.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   communicating with a base station according to a first uplink grant configuration scheduling a first set of uplink transmission occasions having a first density;
   determining that the first density of the first set of uplink transmission occasions is to be increased;
   transmitting, to the base station and based at least in part on the determination, a resource modification information request indicating a requested increase in the first density of the first set of uplink transmission occasions, wherein the resource modification information request comprises information to support assignment of hybrid automatic repeat request (HARQ) identifiers in a second uplink grant configuration associated with the increase in the first density of the first set of uplink transmission occasions to avoid repeating an HARQ process identifier or overlapping with active HARQ process identifiers of the first configuration; and
   receiving, in response to the resource modification information request, a message increasing the first set of uplink transmission occasions to a second density that is greater than the first density,
   wherein the UE determines that there is at least one active HARQ process having a corresponding HARQ identifier associated with the first uplink grant configuration, and wherein the information to support assignment of HARQ identifiers in the second uplink grant configuration is configured based at least in part on the at least one active HARQ process.

2. The method of claim 1, wherein the information comprises an indication of a request that the hybrid automatic repeat request process identifier be based at least in part on an equation.

3. The method of claim 2, further comprising:
   identifying an offset value for the hybrid automatic repeat request process identifier based at least in part on the hybrid automatic repeat request process identifier being based at least in part on the equation; and
   including an indication of the offset value in the resource modification information request.

4. The method of claim 3, wherein identifying the offset value for the hybrid automatic repeat request process identifier comprises:
   determining the offset value based at least in part on a next available hybrid automatic repeat request process identifier.

5. The method of claim 3, wherein identifying the offset value for the hybrid automatic repeat request process identifier comprises:
   determining the offset value based at least in part on a total number of configured hybrid automatic repeat request processes.

6. The method of claim 2, further comprising:
   determining the hybrid automatic repeat request process identifier based at least in part on the equation and the second density of the first set of uplink transmission occasions.

7. The method of claim 2, further comprising:
   receiving, via the message, an indication of a number of hybrid automatic repeat request processes associated with the second density of the first set of uplink transmission occasions; and determining the hybrid automatic repeat request process identifier based at least in part on the equation and the number of hybrid automatic repeat request processes.

8. The method of claim 1, wherein the information comprises an indication of a request that a hybrid automatic repeat request process identifier be assigned at the UE.

9. The method of claim 8, further comprising:
receiving, via the message and based at least in part on the request to assign the hybrid automatic repeat request process identifier at the UE, an indication that the hybrid automatic repeat request process identifier is decoupled from a retransmission timer associated with at least one of the first set of uplink transmission occasions; and
receiving, via the message and based at least in part on the request to assign the hybrid automatic repeat request process identifier at the UE, an indication that a timer for one or more of the first set of uplink transmission occasions is set to a value of the retransmission timer.

10. The method of claim 1, further comprising:
determining to request to assign respective hybrid automatic repeat request process identifiers at the UE for one or more first subsets of the first set of uplink transmission occasions;
determining to request that respective hybrid automatic repeat request process identifiers for one or more second subsets of the first set of uplink transmission occasions be based at least in part on an equation, wherein the information comprises an indication of one or more first requests to assign respective hybrid automatic repeat request process identifiers for the one or more first subsets at the UE and an indication of one or more second requests that respective hybrid automatic repeat request process identifiers for the one or more second subsets be based at least in part on the equation.

11. The method of claim 1, wherein transmitting the resource modification information request comprises:
including an indication of whether to reset a timer associated with one or more of the first set of uplink transmission occasions.

12. The method of claim 11, further comprising:
receiving, via the message, an indication that the timer associated with one or more of the first set of uplink transmission occasions is reset.

13. The method of claim 1, further comprising:
receiving, via the message, an indication that the second density of the first set of uplink transmission occasions comprises an additional subset of uplink transmission occasions.

14. The method of claim 1, wherein transmitting the resource modification information request comprises:
including, in the resource modification information request, a request for a decreased periodicity in the first set of uplink transmission occasions, wherein the request for the increase in the first density of the first set of uplink transmission occasions comprises the request for the decreased periodicity.

15. The method of claim 1, wherein transmitting the resource modification information request comprises:
including, in the resource modification information request, a request for an increase in a number of groups of repetitions of the first set of uplink transmission occasions, wherein the request for the increase in the first density of the first set of uplink transmission occasions comprises the request for the increase in the number of groups of repetitions.

16. The method of claim 1, wherein transmitting the resource modification information request comprises:
including, in the resource modification information request, a request for an increase in a number of resource blocks for the first set of uplink transmission occasions or an increase in a modulation coding scheme of the first set of uplink transmission occasions, wherein the request for the increase in the first density of the first set of uplink transmission occasions comprises the request for the increase in the number of resource blocks or the request for the increase in the modulation coding scheme.

17. The method of claim 1, further comprising:
indicating one or more parameters of the resource modification information request using one or more parameters preconfigured by the base station; and
receiving, via the message and based at least in part on the one or more parameters preconfigured by the base station, an indication of the increase of the first set of uplink transmission occasions to the second density.

18. The method of claim 1, further comprising:
including, in the resource modification information request, an indication of a preconfigured grant configuration, wherein the indication of the preconfigured grant configuration comprises the request for the increase in the first density of the first set of uplink transmission occasions; and
receiving, via the message and based at least in part on the preconfigured grant configuration, an indication of the increase of the first set of uplink transmission occasions to the second density.

19. The method of claim 1, wherein transmitting the resource modification information request comprises:
transmitting an uplink control information message comprising the resource modification information request.

20. The method of claim 1, wherein transmitting the resource modification information request comprises:
transmitting a first portion of an uplink control information message comprising an indication of the resource modification information request; and
transmitting, based at least in part on transmitting the first portion, a second portion of the uplink control information message comprising the resource modification information request.

21. The method of claim 1, wherein the resource modification information request indicates a request by the UE to determine HARQ identifiers for the second uplink grant configuration using at least one of: UE-assigned HARQ identifiers, an equation-based assignment indicated by the UE, a requested offset for the equation-based assignment, a request to reset one or more retransmission timers, or a combination thereof.

22. A method for wireless communication at a base station, comprising:
communicating with a user equipment (UE) according to a first uplink grant configuration scheduling a first set of uplink transmission occasions for communications between the UE and the base station, the first set of uplink transmission occasions having a first density;
receiving, from the UE, a resource modification information request indicating a requested increase in the first density of the first set of uplink transmission occasions, wherein the resource modification information request comprises information to support assignment of hybrid automatic repeat request (HARQ) identifiers in a second uplink grant configuration associated with the increase in the first density of the first set of uplink transmission occasions to avoid repeating an HARQ process identifier or overlapping with active HARQ process identifiers in the first uplink grant configuration; and transmitting, to the UE and in response to the resource modification information request, a message increasing the first set of uplink transmission occasions to a second density that is greater than the first density, wherein the communicating comprises at least one active HARQ process having a corresponding HARQ identifier associated with the first uplink grant configuration, and wherein the information to support assignment of HARQ identifiers in the second uplink grant configuration is configured is based at least in part on the at least one active HARQ process.

23. The method of claim 22, wherein the information comprises an indication of a request that a hybrid automatic repeat request process identifier be based at least in part on an equation; and configuring the message based at least in part on the request that the hybrid automatic repeat request process identifier be based at least in part on the equation.

24. The method of claim 23, further comprising:
receiving, via the resource modification information request, an offset value for the hybrid automatic repeat request process identifier based at least in part on the request that the hybrid automatic repeat request process identifier be based at least in part on the equation; and
configuring the message based at least in part on the offset value.

25. The method of claim 23, further comprising:
transmitting, via the message, an indication of a number of hybrid automatic repeat request processes associated with the second density of the first set of uplink transmission occasions, wherein the hybrid automatic repeat request process identifier is based at least in part on the equation and the number of hybrid automatic repeat request processes.

26. The method of claim 22, wherein the information comprises an indication of a request to assign a hybrid automatic repeat request process identifier at the UE; and
configuring the message based at least in part on the request to assign the hybrid automatic repeat request process identifier at the UE.

27. The method of claim 26, further comprising:
transmitting, via the message and based at least in part on the request to assign the hybrid automatic repeat request process identifier at the UE, an indication that the hybrid automatic repeat request process identifier is decoupled from a retransmission timer associated with at least one of the first set of uplink transmission occasions; and
transmitting, via the message and based at least in part on the request to assign the hybrid automatic repeat request process identifier at the UE, an indication that a timer for one or more of the first set of uplink transmission occasions is set to a value of the retransmission timer.

28. The method of claim 22, wherein the information comprises an indication of one or more first requests to assign respective hybrid automatic repeat request process identifiers at the UE for one or more first subsets of the first set of uplink transmission occasions and an indication of one or more second requests that respective hybrid automatic repeat request process identifiers for one or more second subsets of the first set of uplink transmission occasions be based at least in part on an equation; and configuring the message based at least in part on the one or more first requests and the one or more second requests.

29. The method of claim 22, further comprising:
transmitting, via the message, an indication that the second density of the first set of uplink transmission occasions comprises an additional subset of uplink transmission occasions.

30. The method of claim 22, wherein the resource modification information request indicates a request by the UE to determine HARQ identifiers for the second uplink grant configuration using at least one of: UE-assigned HARQ identifiers, an equation-based assignment indicated by the UE, a requested offset for the equation-based assignment, a request to reset one or more retransmission timers, or a combination thereof.

31. An apparatus for wireless communication at a user equipment (UE), comprising:
a processor;
memory coupled with the processor; and
instructions stored in the memory and executable by the processor to cause the apparatus to:
communicate with a base station according to a first uplink grant configuration scheduling a first set of uplink transmission occasions having a first density;
determine that the first density of the first set of uplink transmission occasions is to be increased;
transmit, to the base station and based at least in part on the determination, a resource modification information request indicating a requested increase in the first density of the first set of uplink transmission occasions,
wherein the resource modification information request comprises information to support assignment of hybrid automatic repeat request (HARQ) identifiers in a second uplink grant configuration associated with the increase in the first density of the first set of uplink transmission occasions to avoid repeating an HARQ process identifier or overlapping with active HARQ process identifiers in the first uplink grant configuration; and
receive, in response to the resource modification information request, a message increasing the first set of uplink transmission occasions to a second density that is greater than the first density,
wherein the UE determines that there is at least one active HARQ process having a corresponding HARQ identifier associated with the first uplink grant configuration, and wherein the information to support assignment of HARQ identifiers in the second uplink grant configuration is configured based at least in part on the at least one active HARQ process.

32. An apparatus for wireless communication at a base station, comprising:
a processor;
memory coupled with the processor; and
instructions stored in the memory and executable by the processor to cause the apparatus to:
communicate with a user equipment (UE) according to a first uplink grant configuration scheduling a first set of uplink transmission occasions for communications between the UE and the base station, the first set of uplink transmission occasions having a first density;

receive, from the UE, a resource modification information request indicating a requested increase in the first density of the first set of uplink transmission occasions, wherein the resource modification information request comprises information to support assignment of hybrid automatic repeat request (HARQ) identifiers in a second uplink grant configuration associated with the increase in the first density of the first set of uplink transmission occasions to avoid repeating an HARQ process identifier or overlapping with active HARQ process identifiers in the first uplink grant configuration; and transmit, to the UE and in response to the resource modification information request, a message increasing the first set of uplink transmission occasions to a second density that is greater than the first density, wherein communication with the UE comprises at least one active HARQ process having a corresponding HARQ identifier associated with the first uplink grant configuration, and wherein the information to support assignment of HARQ identifiers in the second uplink grant configuration is configured is based at least in part on the at least one active HARQ process.

* * * * *